US011032702B2

(12) United States Patent
Kim et al.

(10) Patent No.: US 11,032,702 B2
(45) Date of Patent: Jun. 8, 2021

(54) METHOD AND APPARATUS FOR IDENTIFYING SECURITY KEY IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/946,446

(22) Filed: Jun. 22, 2020

(65) Prior Publication Data

US 2020/0336903 A1    Oct. 22, 2020

Related U.S. Application Data

(63) Continuation of application No. 16/576,605, filed on Sep. 19, 2019, now Pat. No. 10,694,377.

(30) Foreign Application Priority Data

Sep. 19, 2018 (KR) .................. 10-2018-0112498
Oct. 23, 2018 (KR) .................. 10-2018-0127036

(51) Int. Cl.
*H04W 4/00* (2018.01)
*H04W 12/0433* (2021.01)
(Continued)

(52) U.S. Cl.
CPC ....... *H04W 12/0433* (2021.01); *H04W 12/45* (2021.01); *H04W 76/11* (2018.02)

(58) Field of Classification Search
USPC ......................................... 1/1; 370/329, 328
See application file for complete search history.

(56) References Cited

U.S. PATENT DOCUMENTS 10,432,291 B2 * 10/2019 Agiwal ............. H04W 12/0013
10,694,377 B2 *  6/2020 Kim ................ H04W 12/04033
(Continued)

FOREIGN PATENT DOCUMENTS

KR    10-2018-0035809 A    4/2018

OTHER PUBLICATIONS

ISA/KR, International Search Report and Written Opinion of the International Searching Authority, International Application No. PCT/KR2019/012173, dated Dec. 27, 2019, 8 pages.
(Continued)

*Primary Examiner* — David Q Nguyen

(57) ABSTRACT

The disclosure relates to a communication scheme and system for converging a $5^{th}$ generation (5G) communication system for supporting a data rate higher than that of a $4^{th}$ generation (4G) system with an internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. The disclosure relates to a method and apparatus for allowing a base station to identify a ciphering key (COUNT value) for security enhancement.

20 Claims, 22 Drawing Sheets

(51) Int. Cl.
*H04W 76/11* (2018.01)
*H04W 12/45* (2021.01)

(56) References Cited

U.S. PATENT DOCUMENTS

| | | |
|---|---|---|
| 2015/0133135 A1 | 5/2015 | Zhang et al. |
| 2015/0341786 A1 | 11/2015 | Wang et al. |
| 2017/0034756 A1 | 2/2017 | Faccin et al. |
| 2018/0083688 A1 | 3/2018 | Agiwal et al. |
| 2019/0053122 A1* | 2/2019 | Wu .................. H04W 40/24 |
| 2019/0059124 A1* | 2/2019 | Wu .................. H04L 69/08 |
| 2019/0149365 A1* | 5/2019 | Chatterjee ............. H04L 5/0092 370/329 |
| 2019/0174466 A1* | 6/2019 | Zhang ................ H04W 72/042 |
| 2019/0199503 A1* | 6/2019 | Son .................. H04L 5/0053 |
| 2021/0021437 A1* | 1/2021 | Qiao .................. H04W 8/02 |

OTHER PUBLICATIONS

3GPP TS 33.401 V15.4.0 (Jun. 2018) Technical Specification, 3rd Generation Partnership Project; Technical Specification Group Services and System Aspects; 3GPP System Architecture Evolution (SAE); Security architecture (Release 15), Jun. 2018, 162 pages.

\* cited by examiner

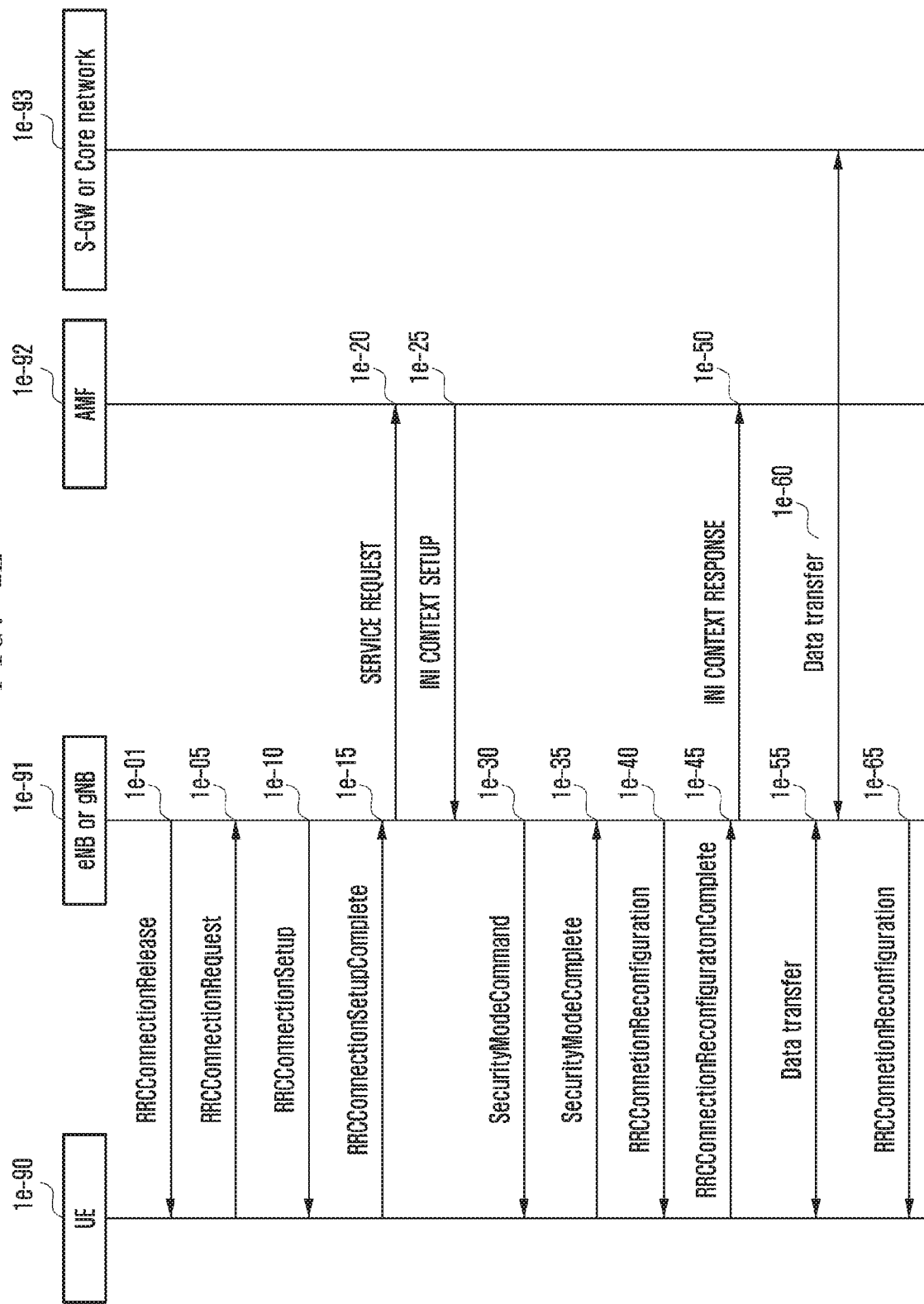

COUNT

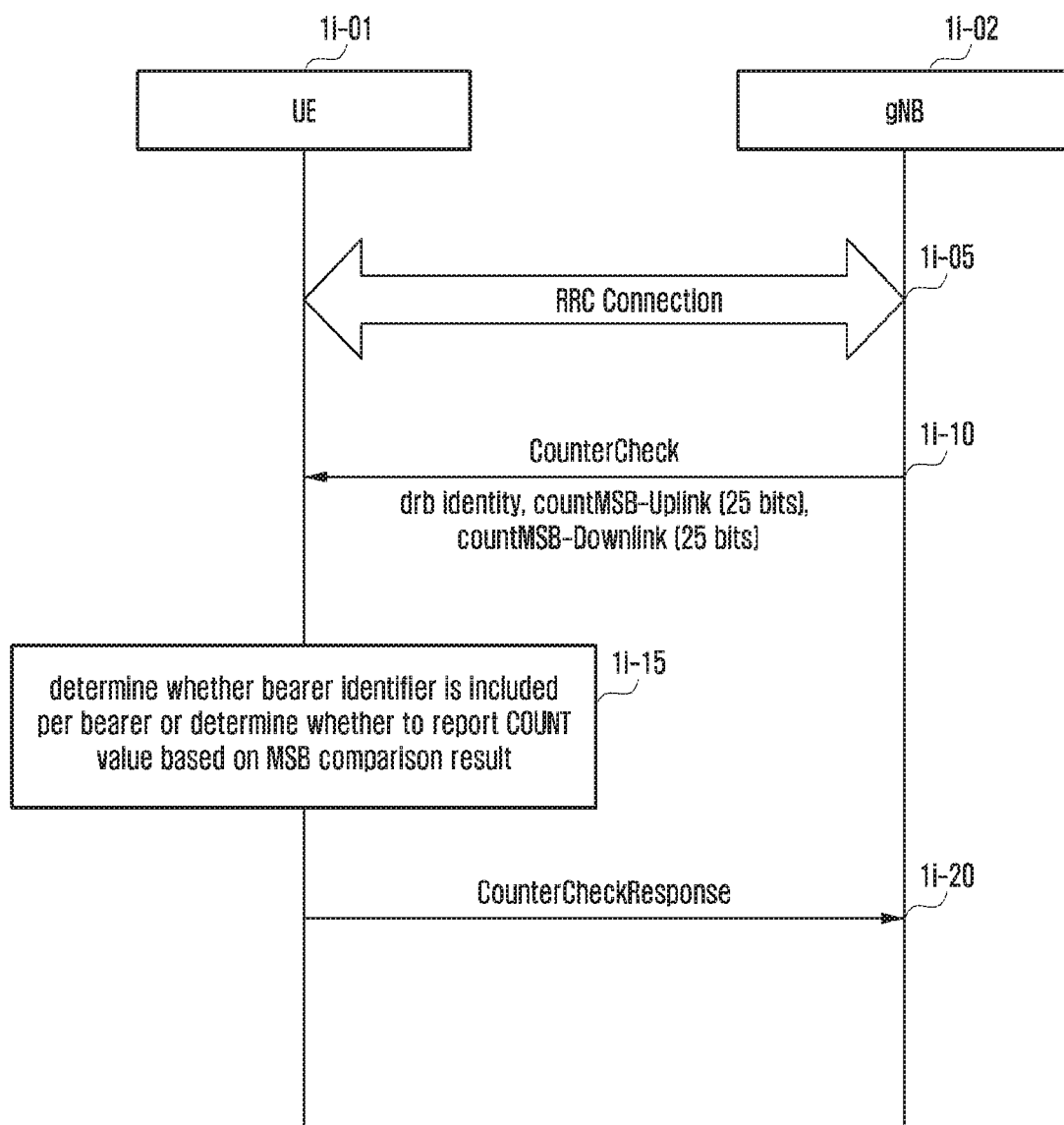

METHOD AND APPARATUS FOR IDENTIFYING SECURITY KEY IN NEXT GENERATION MOBILE COMMUNICATION SYSTEM

CROSS-REFERENCE TO RELATED APPLICATIONS

This application is a continuation of application Ser. No. 16/576,605, filed Sep. 19, 2019, which claims priority under 35 U.S.C. 119 to Korean Patent Application Nos. 10-2018-0112498, filed Sep. 19, 2018 and 10-2018-0127036, filed Oct. 23, 2018 in the Korean Intellectual Property Office, the disclosures of which are herein incorporated by reference in their entireties.

BACKGROUND

1. Field

The disclosure relates to operations of a terminal and a base station in a mobile communication system and, in particular, to a ciphering key (COUNT value) identification method and apparatus of the base station for security enhancement in a next generation mobile communication system. The disclosure also relates to a method and apparatus for configuring and supporting device-to-device communication in the next generation mobile communication system.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The 5G systems will support more diverse services in comparison with the legacy 4G systems. Examples of representative services may include enhanced mobile broadband (eMBB) services, ultra-reliable and low latency communication (URLLC) services, massive machine type communication (mMTC) services, and evolved multimedia broadcast/multicast services (eMBMS). A system supporting the URLLC services may be called URLLC system, and a system supporting the eMBB services may be called eMBB system. The terms "service" and "system" may be interchangeably used.

Among these services, the URLLC service is newly considered for the 5G system, while not being considered for 4G systems, and has requirements of ultra-reliability (e.g., packet error rate of about 10-5) and low latency (e.g., about 0.5 msec). In order to meet such demanding requirements, the URLLC service may be provided with a transmission time interval shorter than that of the eMBB service in consideration of various operation schemes.

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

There are various attempts to apply the IoT to the 5G communication system. For example, the sensor network, Machine to Machine (M2M), and Machine Type Communication (MTC) technologies are implemented by means of the 5G communication technologies such as beamforming, MIMO, and array antenna. The application of the aforementioned cloud RAN as a big data processing technology is an example of convergence between the 5G and IoT technologies.

SUMMARY

In a next generation mobile communication system, terminals and base stations cipher and decipher data to be transmitted and received. Typically, a ciphering and deciphering algorithm is used to cipher and decipher data with an ciphering key (or security key). The ciphering key includes ciphering keys (e.g., KgNB and K_RRCenc) agreed between a terminal and a base station and security keys (e.g., COUNT values) varying with data. Because the COUNT value consists of a PDCP sequence number and a hyper frame number (HFN), it is necessary to acquire synchronization of a PDCP sequence number between a transmitting PDCP entity and a receiving PDCP entity. Given that the PDCP sequence number increases from 0 to 2^(PDCP sequence number length)−1 and, if reaching its maximum value, it goes back to 0 and the HFN number increases by 1; if the PDCP sequence number restarts from 0 after it reaches its maximum value, the COUNT value in use for data ciphering by the transmitting PDCP entity and the COUNT value in use for data description by the receiving PDCP entity may differ from each other, which leads to a decoding failure and HFN desynchronization problem.

Such decoding failure and HFN desynchronization problem may be caused by a large amount of data loss or unexpected data invasion by a hacker. Accordingly, in case of necessity, e.g., if suspected of decoding failure or HFN desynchronization problem or data invasion by a hacker, it is necessary for the base station to verify whether the COUNT value is well synchronized between the transmitting PDCP entity and the receiving PDCP entity.

Meanwhile, the next generation mobile communication system may be deployed for controlling a large number of wireless devices, which facilitates factory automation. In order to guarantee errorless operations of the wireless devices in an automated factory, the communication system has to support low-latency high-liability data transmission among the wireless devices (Industrial IoT devices).

The objects of the disclosure are not limited to the aforesaid, and other objects not described herein will be clearly understood by those skilled in the art from the descriptions below.

In accordance with an aspect of the present disclosure, a method of a terminal in a wireless communication system is provided. The method comprises receiving, from a base station, a first message including a first list associated with count values of the base station, the first list includes at least one bearer identity, at least one first downlink count value of the base station associated to each bearer, and at least one first uplink count value of the base station associated to each bearer; determining whether a first bearer is configured with a new radio (NR) packet data convergence protocol (PDCP); in case that the first bearer is configured with the NR PDCP, and at least one of a second downlink count value of the terminal associated to the first bearer is different from the first downlink count value associated to the first bearer or a second uplink count value of the terminal associated to the first bearer is different from the first uplink count value associated to the first bearer, generating a second list associated with count values of the terminal including a first bearer identity of the first bearer, the second downlink count value of the terminal associated to the first bearer, and the second uplink count value of the terminal associated to the first bearer; and transmitting, to the base station, a second message including the second list as a response to the first message, wherein the second downlink count value of the terminal associated to the first bearer is a count value of a next PDCP service data unit (SDU) expected to be received −1, and the second uplink count value of the terminal associated to the first bearer is a count value of a next PDCP SDU to be transmitted −1.

In one embodiment, the generating the second list further comprises in case that the first bearer is not configured with the NR PDCP, and at least one of a third downlink count value of the terminal associated to the first bearer is different from the first downlink count value associated to the first bearer or a third uplink count value of the terminal associated to the first bearer is different from the first uplink count value associated to the first bearer, generating the second list including the first bearer identity, the third downlink count value of the terminal associated to the first bearer, and the third uplink count value of the terminal associated to the first bearer.

In one embodiment, the method further comprises in case that the first bearer is uni-directional bearer, determining that at least one of the second downlink count value of the terminal associated to the first bearer or the second uplink count value of the terminal associated to the first bearer is to be 0 for an unused direction.

In one embodiment, the generating the second list further comprises in case that a second bearer identity of a second bearer established on the terminal is not included in the first list, generating the second list including the second bearer identity of the second bearer, a fourth downlink count value of the terminal associated to the second bearer, and a fourth uplink count value of the terminal associated to the second bearer, and the fourth downlink count value of the terminal associated to the second bearer is a count value of a next PDCP SDU expected to be received −1 and the fourth uplink count value of the terminal associated to the second bearer is a count value of a next PDCP SDU to be transmitted −1.

In one embodiment, the method further comprises in case that a third bearer included in the first list is not established on the terminal, generating the second list including a third identity of the third bearer, a fifth downlink count value of the terminal associated to the third bearer, and a fifth uplink count value of the terminal associated to the third bearer with most significant bits set identical to a first downlink count value associated to the third bearer and a first uplink count value associated to the third bearer and least significant bits set to 0.

The present disclosure also provides a method of a base station in a wireless communication system. The method comprises transmitting, to a terminal, a first message including a first list associated with count values of the base station, the first list includes at least one bearer identity, at least one first downlink count value of the base station associated to each bearer, and at least one first uplink count value of the base station associated to each bearer; and receiving, from the terminal, a second message including a second list associated with count values of the terminal including a first bearer identity of a first bearer, a second downlink count value of the terminal associated to the first bearer, and a second uplink count value of the terminal associated to the first bearer, as a response to the first message, in case that the first bearer is configured with the NR PDCP, and at least one of the second downlink count value of the terminal associated to the first bearer is different from the first downlink count value associated to the first bearer or the second uplink count value of the terminal associated to the first bearer is different from the first uplink count value associated to the first bearer, wherein the second downlink count value of the terminal associated to the first bearer is a count value of a next PDCP service data unit (SDU) expected to be received −1, and the second uplink count value of the terminal associated to the first bearer is a count value of a next PDCP SDU to be transmitted −1.

In one embodiment, in case that the first bearer is not configured with the NR PDCP, and at least one of a third downlink count value of the terminal associated to the first bearer is different from the first downlink count value associated to the first bearer or a third uplink count value of the terminal associated to the first bearer is different from the first uplink count value associated to the first bearer, the second list includes the first bearer identity, the third downlink count value of the terminal associated to the first bearer, and the third uplink count value of the terminal associated to the first bearer.

In one embodiment, in case that the first bearer is uni-directional bearer, at least one of the second downlink count value of the terminal associated to the first bearer or the second uplink count value of the terminal associated to the first bearer is to be 0 for an unused direction.

In one embodiment, in case that a second bearer identity of a second bearer established on the terminal is not included in the first list, the second list includes the second bearer identity of the second bearer, a fourth downlink count value of the terminal associated to the second bearer, and a fourth uplink count value of the terminal associated to the second bearer, and the fourth downlink count value of the terminal associated to the second bearer is a count value of a next PDCP SDU expected to be received −1 and the fourth uplink count value of the terminal associated to the second bearer is a count value of a next PDCP SDU to be transmitted −1

In one embodiment, in case that a third bearer included in the first list is not established on the terminal, the second list includes a third identity of the third bearer, a fifth downlink count value of the terminal associated to the third bearer, and a fifth uplink count value of the terminal associated to the third bearer with most significant bits set identical to a first downlink count value associated to the third bearer and a first uplink count value associated to the third bearer and least significant bits set to 0.

The present disclosure also provides a terminal in a wireless communication system. The terminal comprises a transceiver; and a controller configured to: control the transceiver to receive, from a base station, a first message including a first list associated with count values of the base station, the first list includes at least one bearer identity, at least one first downlink count value of the base station associated to each bearer, and at least one first uplink count value of the base station associated to each bearer, determine whether a first bearer is configured with a new radio (NR) packet data convergence protocol (PDCP), in case that the first bearer is configured with the NR PDCP, and at least one of a second downlink count value of the terminal associated to the first bearer is different from the first downlink count value associated to the first bearer or a second uplink count value of the terminal associated to the first bearer is different from the first uplink count value associated to the first bearer, generate a second list associated with count values of the terminal including a first bearer identity of the first bearer, the second downlink count value of the terminal associated to the first bearer, and the second uplink count value of the terminal associated to the first bearer, and control the transceiver to transmit, to the base station, a second message including the second list as a response to the first message, wherein the second downlink count value of the terminal associated to the first bearer is a count value of a next PDCP service data unit (SDU) expected to be received −1, and the second uplink count value of the terminal associated to the first bearer is a count value of a next PDCP SDU to be transmitted −1.

The present disclosure also provides a base station in a wireless communication system. The base station comprises a transceiver; and a controller configured to: control the transceiver to transmit, to a terminal, a first message including a first list associated with count values of the base station, the first list includes at least one bearer identity, at least one first downlink count value of the base station associated to each bearer, and at least one first uplink count value of the base station associated to each bearer, and control the transceiver to receive, from the terminal, a second message including a second list associated with count values of the terminal including a first bearer identity of a first bearer, a second downlink count value of the terminal associated to the first bearer, and a second uplink count value of the terminal associated to the first bearer, as a response to the first message, in case that the first bearer is configured with the NR PDCP, and at least one of the second downlink count value of the terminal associated to the first bearer is different from the first downlink count value associated to the first bearer or the second uplink count value of the terminal associated to the first bearer is different from the first uplink count value associated to the first bearer, wherein the second downlink count value of the terminal associated to the first bearer is a count value of a next PDCP service data unit (SDU) expected to be received −1, and the second uplink count value of the terminal associated to the first bearer is a count value of a next PDCP SDU to be transmitted −1.

As described above, the method and apparatus according to a disclosed embodiment is advantageous in terms of being able to solve a decoding failure and HFN desynchronization problem that may arise during data communication by allowing for a transmitter (e.g., base station) to verify whether a COUNT value is well synchronized between a transmitting PDCP entity and a receiving PDCP entity in case of necessity, e.g., if suspected of decoding failure or HFN desynchronization problem or data invasion by a hacker.

The method and apparatus according to a disclosed embodiment is advantageous in terms of supporting a wireless network in a factory to facilitate configuration of reliable point-to-point wireless links for continuous low-latency data communication by deploying a next generation mobile communication system in an automized factory facility supporting a wired time sensitive network (TSN) guaranteeing low-latency and high-reliability.

The advantages of the disclosure are not limited to the aforesaid, and other advantages not described herein may be clearly understood by those skilled in the art from the descriptions below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In the drawings, the same or similar reference numerals may be used for the same or similar components.

FIG. 1E illustrates a signal flow diagram of an RRC connection configuration procedure between a UE and a base station for establishing a connection to a network in a next generation mobile communication system according to some embodiments of the disclosure;

FIG. 1I illustrates a signal flow diagram of a COUNT CHECK procedure proposed in an embodiment of the disclosure;

FIG. 2I illustrates a block diagram of a configuration of a base station or a wireless node in a wireless communication system according to an embodiment of the disclosure.

DETAILED DESCRIPTION

Figure 1A:
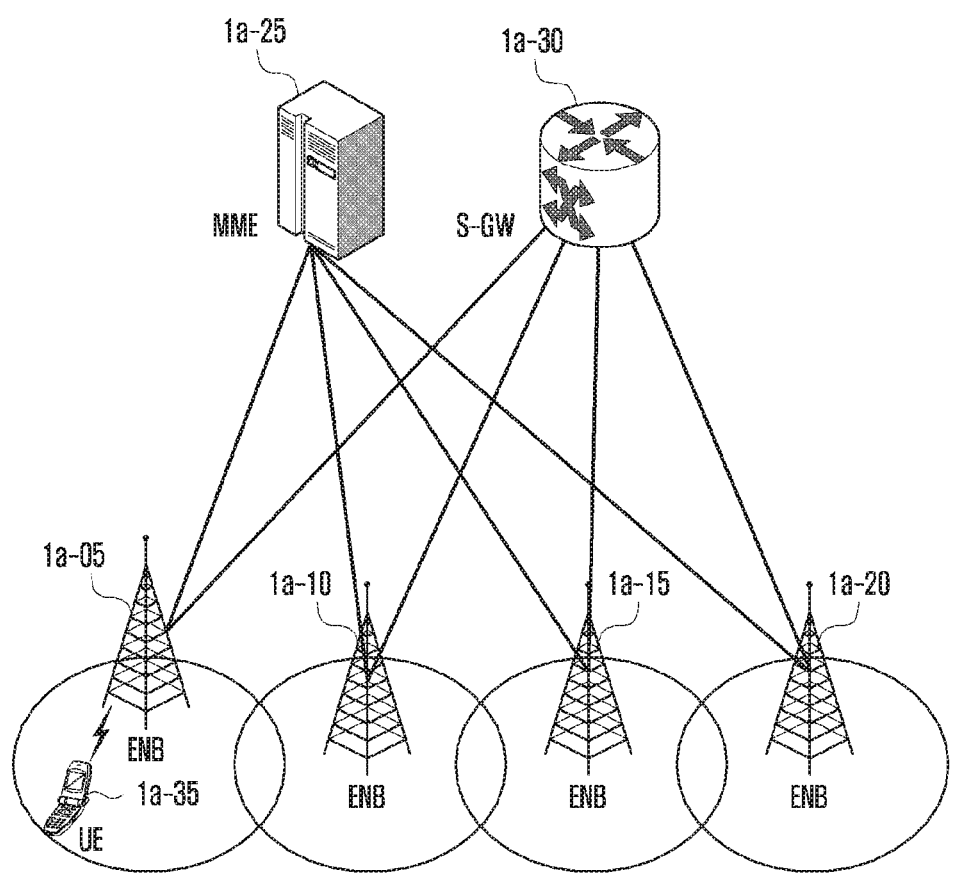
FIG. 1A illustrates a diagram of architecture of an LTE system to which the disclosure is applied.

FIGS. 1A through 2I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The operation principle of the disclosure is described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Detailed descriptions of well-known functions and structures incorporated herein may be omitted to avoid obscuring the subject matter of the disclosure. Exemplary embodiments of the disclosure are described hereinafter in detail with reference to the accompanying drawings.

The terms used, in the following description, for indicating access nodes, network entities, messages, interfaces between network entities, and diverse identity informations are provided for convenience of explanation. Accordingly, the terms used in the following description are not limited to specific meanings but may be replaced by other terms equivalent in technical meanings.

In the following description, the terms and definitions given in the 3$^{rd}$ Generation Partnership Project Long Term Evolution (3GPP LTE) standard are used. However, the disclosure is not limited by the terms and definitions but can be applied to other standard communication systems. In the following description, the terms "eNB" and "gNB" are interchangeably used for convenience of explanation. That is, a base station prementioned as eNB may be referred to as gNB. In the following description, the term "terminal" may be used to refer to any of hand-held phones, NB-IoT devices, sensors, and other wireless communication devices.

Embodiment A

In a next generation mobile communication system, terminals and base stations cipher and decipher data to be transmitted and received. Typically, an ciphering and deciphering algorithm is used to cipher and decrypt data with an ciphering key (or security key). The ciphering key includes ciphering keys (e.g., KgNB and K_RRCenc) agreed between a terminal and a base station and security keys (e.g., COUNT values) varying with data. Because the COUNT value consists of a PDCP sequence number and a hyper frame number (HFN), it is necessary to acquire synchronization of a PDCP sequence number between a transmitting PDCP entity and a receiving PDCP entity. Given that the PDCP sequence number increases from 0 to 2^(PDCP sequence number length)−1 and, if reaching its maximum value, it goes back to 0 and the HFN number increases by 1; if the PDCP sequence number restarts from 0 after it reaches its maximum value, the COUNT value in use for data ciphering by the transmitting PDCP entity and the COUNT value in use for data description by the receiving PDCP entity may differ from each other, which leads to a decoding failure and HFN desynchronization problem.

Such decoding failure and HFN desynchronization problem may be caused by a large amount of data loss or unexpected data invasion by a hacker. Accordingly, in case of necessity, e.g., if suspected of decoding failure or HFN desynchronization problem or data invasion by a hacker, it is necessary for the base station to verify whether the COUNT value is well synchronized between the transmitting PDCP entity and the receiving PDCP entity.

The disclosure discloses a method and apparatus for solving a decoding failure and HFN desynchronization problem that may arise during data communication by allowing for a transmitter (e.g., base station) to verify whether a COUNT value is well synchronized between a transmitting PDCP entity and a receiving PDCP entity in case of necessity, e.g., if suspected of decoding failure or HFN desynchronization problem or data invasion by a hacker.

FIG. 1A illustrates a diagram of architecture of an LTE system to which the disclosure is applied.

In reference to FIG. 1A, a radio access network of the LTE system includes evolved Node Bs (hereinafter, interchangeably referred to as eNB, node B, and base station) 1a-05, 1a-10, 1a-15, and 1a-20; a mobility management entity (MME) 1a-25; and a serving gateway (S-GW) 1a-30. A user terminal (hereinafter, interchangeably referred to as user equipment (UE) and terminal) 1a-35 connects to an external network via the eNBs 1a-05, 1a-10, 1a-15, and 1a-20 and the S-GW 1a-30.

The eNBs 1a-05, 1a-10, 1a-15, and 1a-20 correspond to the legacy node Bs of the universal mobile telecommunications system (UMTS). The UE 1a-35 connects to one of the eNBs via a radio channel, and the eNB has more complex functions than the legacy node B. In the LTE system where all user traffic including real time services such as Voice over IP (VoIP) is served through shared channels, there is a need of an entity for collecting UE-specific status information (such as buffer status, power headroom status, and channel status) and scheduling the UEs based on the collected information, and the eNB takes charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 1a-30 handles data bearer functions to establish and release data bearer under the control of the MME 1a-25. The MME 1a-25 handles various control functions for the UE as well as the mobile management function and has connections with the eNBs 1a-05, 1a-10, 1a-15, and 1a-20.

Figure 1B:
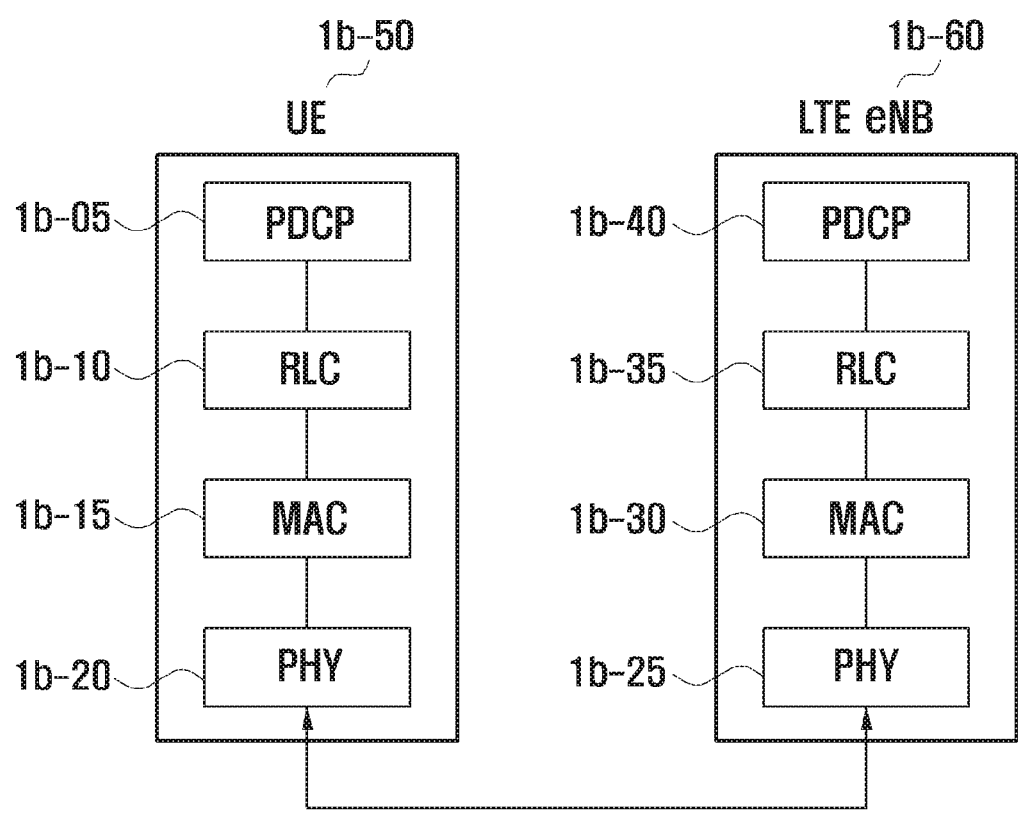
FIG. 1B illustrates a diagram of a protocol stack of an LTE system to which the disclosure is applied.

FIG. 1B illustrates a diagram of a protocol stack of an LTE system to which the disclosure is applied.

As shown in FIG. 1B, the protocol stack of the interface between the UE 1b-50 and the eNB 1b-60 in the LTE system includes Packet Data Convergence Protocol (PDCP) 1b-05 and 1b-40, Radio Link Control (RLC) 1b-10 and 1b-35, and Medium Access Control (MAC) 1b-15 and 1b-30. The PDCP 1b-05 and 1b-40 takes charge of compressing/decompressing an IP header. The main functions of the PDCP 1b-05 and 1b-40 can be summarized as follows Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC 1b-10 and 1b-35 takes charge of reformatting PDCP PDUs in order to fit them into the size for ARQ operation. The main functions of the RLC layer can be summarized as follows:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 1b-15 and 1b-30 allows for connection of multiple RLC entities established for one UE and takes charge of multiplexing RLC PDUs from the RLC layer into a MAC PDU and demultiplexing a MAC PDU into RLC PDUs. The main functions of the MAC layer can be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The PHY 1b-20 and 1b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 1C:
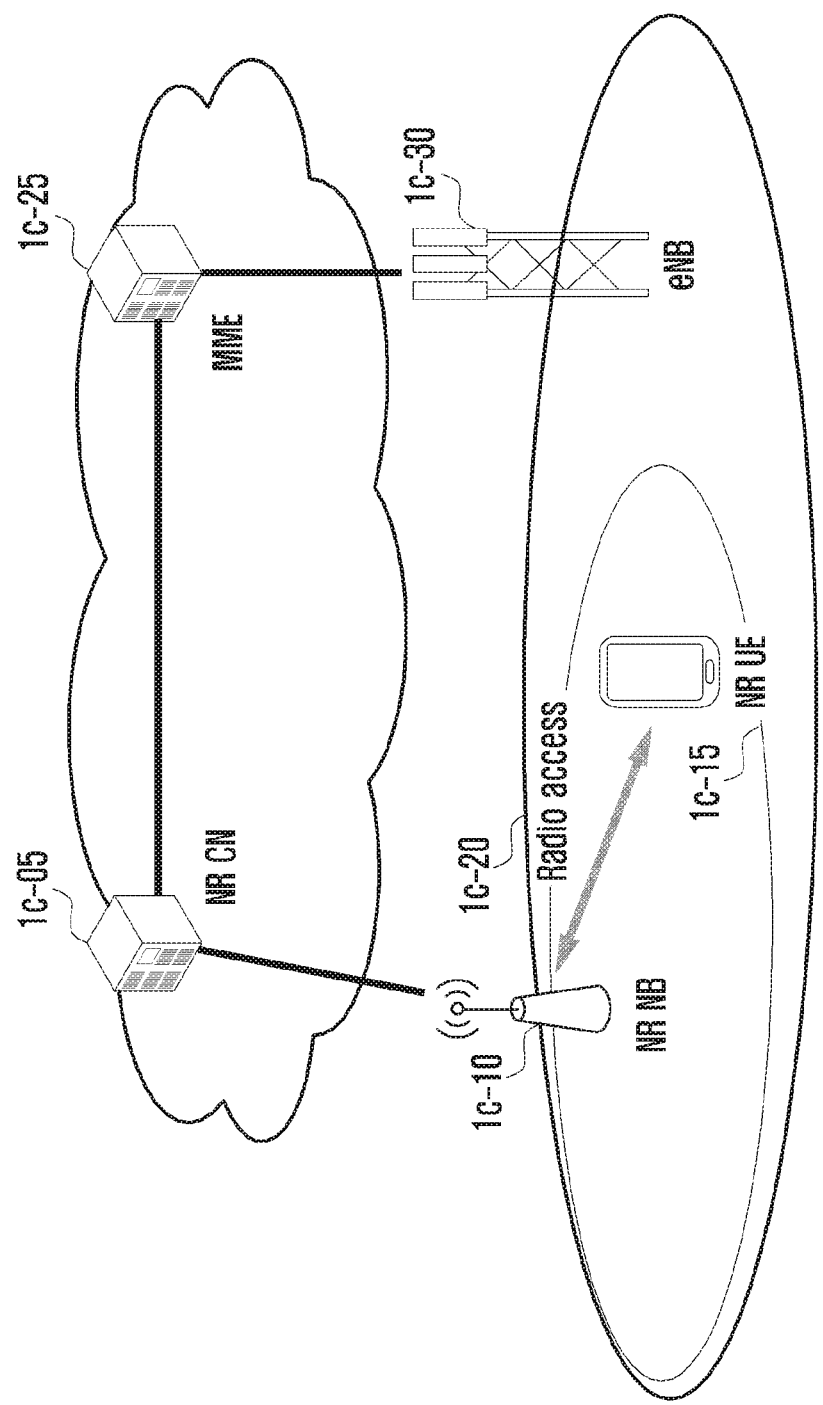
FIG. 1C illustrates a diagram of architecture of a next generation mobile communication system to which the disclosure is applied.

FIG. 1C illustrates a diagram of architecture of a next generation mobile communication system to which the disclosure is applied.

As shown in FIG. 1C, the next generation mobile communication system includes a radio access network with a next generation base station (New Radio Node B (NR gNB)) 1c-10 and a new radio core network (NR CN) 1c-05. A new radio user equipment (NR UE) 1c-15 connects to an external network via the NR gNB 1c-10 and the NR CN 1c-05.

In FIG. 1C, the NR gNB 1c-10 corresponds to an evolved Node B (eNB) of the legacy LTE. The NR gNB 1c-10 to which the NR UE 1c-15 connects through a radio channel is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 1c-10 takes charge of this function. Typically, one NR gNB hosts multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 1c-05 takes charge of mobility support, bearer setup, and QoS configuration. The NR CN 1c-05 may take charge of a NR UE mobility management function, and a plurality of NR gNBs may connect to the NR CN 1c-05. The next generation mobile communication system may also interoperate with a legacy LTE system and, in this case, the NR CN 1c-05 connects to an MME 1c-25 through a network interface. The MME 1c-25 communicates with the eNB 1c-40 as a legacy base station.

Figure 1D:
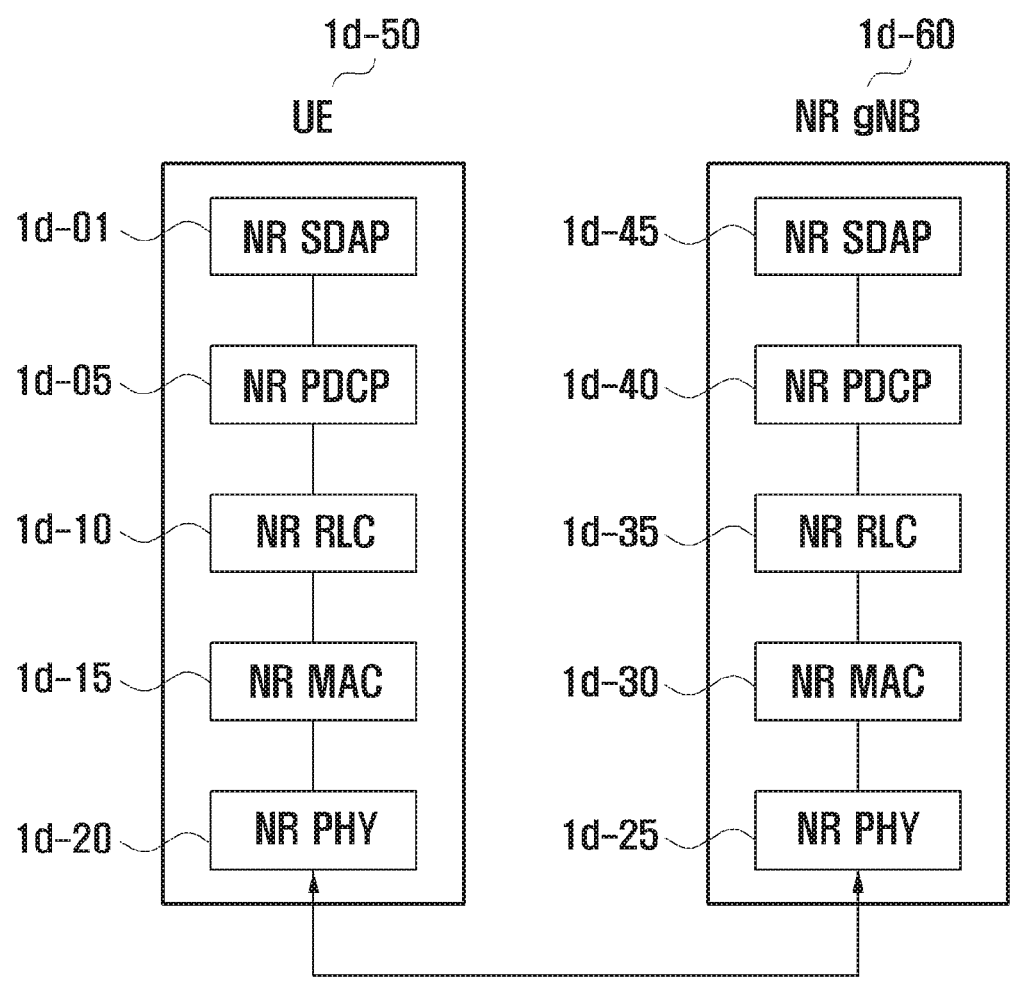
FIG. 1D illustrates a diagram of a protocol stack of a next generation mobile communication system to which the disclosure is applied.

FIG. 1D illustrates a diagram of a protocol stack of a next generation mobile communication system to which the disclosure is applied.

As shown in FIG. 1D, the protocol stack of the interface between an UE 1d-50 and an NR gNB 1d-60 in a next generation mobile communication system includes NR service data adaptation protocol (NR SDAP) 1d-01 and 1d-45, NR PDCP 1d-05 and 1d-40, NR RLC 1d-10 and 1d-35, NR MAC 1d-15 and 1d-30.

The main functions of the NR SDAP 1d-01 and 1d-45 may include some of the following functions
  Transfer of user plane data
  Mapping between a QoS flow and a DRB for both DL and UL)
  Marking QoS flow ID in both DL and UL packets
  Reflective QoS flow to DRB mapping for the UL SDAP PDUs).

The UE 1d-50 may receive an RRC message for configuring an SDAP layer entity 1d-01 so as to determine whether to use PDCP entity-specific, bearer-specific, or logical channel-specific SDAP header and whether to use SDAP layer function via an RRC message and, if configured to use a specific PDAP header, receive a 1-bit NAS reflective QoS indicator and an AS reflective QoS indicator in the SDAP header indicative of instructing the UE 1d-50 to update or reconfigure uplink and downlink QoS flow-data bearer mappings. The SDAP header may include QoS flow ID indicating a QoS. The QoS information may be used as data processing priority and scheduling information for guaranteeing service reliability.

The main functions of the NR PDCP 1d-05 and 1d-40 may include some of the following functions:
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The PDCP PDU reordering function of an NR PDCP entity 1d-05 and 1d-40 is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC 1d-10 and 1d-35 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of an NR RLC entity 1d-10 and 1d-35 is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer 1d-10 and 1d-35 may have no concatenation function and, in this case, the concatenation function may be performed in the NR MAC layer 1d-15 and 1d-30 or replaced by the multiplexing function of the NR MAC layer 1d-15 and 1d-30.

The out-of-sequence delivery function of an NR RLC entity 1d-10 and 1d-35 is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

The NR MAC 1d-15 and 1d-30 may be connected to multiple NR RLC entities, and the main functions of the NR MAC 1d-15 and 1d-30 may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1-20 and 1d-25 takes charge of channel-coding and modulation on upper layer data to generate and transmit OFDM symbols over a radio channel and demodulating and channel-decoding on OFDM symbols received over the radio channel to deliver the decoded data to the upper layers.

FIG. 1E illustrates a signal flow diagram of an RRC connection configuration procedure between a UE and a base station for establishing a connection to a network in a next generation mobile communication system according to some embodiments of the disclosure.

In reference to FIG. 1E, if there is no data transmission/reception to/from the UE 1e-90 in an RRC connected mode for any reason or during a predetermined period, the base station 1e-91 may transmit an RRCConnectionRelease message to the UE 1e-90 at step 1e-01 to transition the UE 1e-90 to an RRC idle mode. If data to be transmitted are produced at the UE 1e-90 with no currently established connection (hereinafter, referred to as idle mode UE), the UE 1e-90 performs an RRC connection establishment procedure with the base station 1e-91.

The UE 1e-90 acquires uplink transmission synchronization with the base station 1e-91 through a random access procedure and transmits an RRCConnectionRequest message to the base station 1e-91 at step 1e-05. The RRCConnectionRequest message may include an identifier of the UE 1e-90 and a connection establishment cause (establishmentCause).

The base station 1e-91 transmits an RRCConnectionSetup message to the 1e-90 at step 1e-10 for RRC connection setup. The RRCConnectionSetup message may include at least one of per-logical channel configuration information, per-bearer configuration information, PDCP entity configuration information, RLC entity configuration information, or MAC entity configuration information.

The RRCConnectionSetup message may be used to assign per-bearer identifiers (e.g., signaling radio bearers (SRB) identifier and data radio bearer (DRB) identifiers) and configure per-bearer PDCP, RLC, MAC entity, and PHY entities. The RRCConnectionSetup message may also be used to configure per-bearer PDCP sequence number lengths for use by the PDCP entities (e.g., 12 bits and 18 bits) and RLC sequence number lengths for sue by the RLC entities (e.g., 6 bits, 12 bits, and 18 bits). The RRCConnectionSetup message may also be used to indicate whether a header compression/decompression protocol is used and an integrity protection or verification procedure is used in uplink or downlink for PDCP entities per bearer. The RRCConnectionSetup message may also be used to indicate to the UE 1e-90 whether the out-of-order delivery is performed at the PDCP entities.

After completing RRC connection setup, the UE 1e-90 may transmit an RRCConnectionSetupComplete message to the base station 1e-91 at step 1e-15. The RRCConnectionSetupComplete message may include a control message called SERVICE REQUEST for requesting to an AMF 1e-92 or an MME 1e-92 for establishing a bearer for a certain service. At step 1e-20, the base station 1e-91 transmits the SERVICE REQUEST message included in the RRCConnectionSetupComplete message to the AMF 1e-92 or the MME 1e-92. The AMF 1e-92 or the MME 1e-92 may determine whether to provide the service requested by the UE 1e-90.

If it is determined to provide the service requested by the UE 1e-90, the AMF/MME 1e-92 transmit an INITIAL CONTEXT SETUP REQUEST message to the base station 1e-91 at step 1e-25. The INITIAL CONTEXT SETUP REQUEST message may include quality of service (QoS) information to be applied in configuring a DRB and security information (e.g., Security Key and Security Algorithm) to be applied to the DRB.

For security configuration, the base station 1e-91 transmits a SecurityModeCommand message to the UE 1e-90 at step 1e-30, and the UE 1e-90 transmits a SecurityModeComplete message to the base station 1e-91 at step 1e-35. After completing security configuration, the base station 1e-91 transmits an RRCConnectionReconfiguration message to the UE 1e-90 at step 1e-40.

The RRCConnectionReconfiguration message may be used to assign per-bear identifier (e.g., SRB identifier or DRB identifier) and configure per-bearer PDCP, RLC, MAC, and PHY entities. The RRCConnectionSetup message may also be used to configure per-bearer PDCP sequence number lengths for use by the PDCP entities (e.g., 12 bits and 18 bits) and RLC sequence number lengths for sue by the RLC entities (e.g., 6 bits, 12 bits, and 18 bits). The RRCConnectionSetup message may also be used to indicate whether a header compression/decompression protocol is used and an integrity protection or verification procedure is used in uplink or downlink for PDCP entities per bearer. The RRCConnectionSetup message may also be used to indicate to the UE 1e-90 whether the out-of-order delivery is performed at the PDCP entities.

The RRCConnectionReconfiguration message may include configuration information of a DRB on which user data are processed, and the UE 1e-90 configures a DRB based on the configuration information and transmits an RRCConnectionReconfigurationComplete message to the base station 1e-91 at step 1e-45. After configuring the DRB bearer with the UE 1e-90, the base station 1e-91 may transmit an INITIAL CONTEXT SETUP COMPLETE message the AMF/MME 1e-92 at step 1e-50 to complete establishment of a connection.

After completing the above procedure, the UE 1e-90 and the base station 1e-92 may communicate date via a core network 1e-93 at steps 1e-33 and 1e-60. According to some embodiments, the data transfer procedure may consist of three phases: RRC connection configuration, security configuration, and DRB configuration. The base station 1e-91 may transmit an RRCConnectionReconfiguration message to the UE 1e-90 at step 1e-65 for updating, adding, or modifying the configuration.

The RRCConnectionReconfiguration message may be used to assign per-bear identifier (e.g., SRB identifier or DRB identifier) and configure per-bearer PDCP, RLC, MAC, and PHY entities. The RRCConnectionSetup message may also be used to configure per-bearer PDCP sequence number lengths for use by the PDCP entities (e.g., 12 bits and 18 bits) and RLC sequence number lengths for sue by the RLC entities (e.g., 6 bits, 12 bits, and 18 bits). The RRCConnectionSetup message may also be used to indicate whether a header compression/decompression protocol is used and an integrity protection or verification procedure is used in uplink or downlink for PDCP entities per bearer. The RRCConnectionSetup message may also be used to indicate to the UE 1e-90 whether the out-of-order delivery is performed at the PDCP entities.

The above-described connection configuration procedure between the UE 1e-90 and the base station 1e-91 may be applied either between a UE and an LTE eNB or between a UE and an NR gNB.

In the disclosed embodiments, the term "bearer" may be used to include SRB (signaling radio bearer) and DRB (data radio bearer). Meanwhile, a UM DRB denotes a DRB in use by an RRC entity operating in an unacknowledged mode (UM), and an AM DRB denotes a DRB in use by an RRC entity operating in an acknowledged mode (AM).

The following disclosure discloses a method and apparatus for solving a decoding failure and HFN desynchronization problem that may arise during data communication by allowing for a transmitter (e.g., base station) to verify whether a COUNT value is well synchronized between a transmitting PDCP entity and a receiving PDCP entity in case of necessity, e.g., if suspected of decoding failure or HFN desynchronization problem or data invasion by a hacker.

Before undertaking the detailed description of the method and apparatus for checking the COUNT value, a brief description is made of the operations of transmit and receive PDCP entities.

In the disclosed embodiments, a transmitting PDCP entity operates as follows. The transmitting PDCP entity uses a first COUNT variable, called TX-NEXT, for maintaining a COUNT value to be allocated for transmitting next data in processing data.

The operations of the transmitting PDCP entity that are proposed in the disclosed embodiments are as follows.
- If data (e.g., PDCP SDU) arrives from the upper layer, the transmitting PDCP entity starts a PDCP data discard timer and, if the timer expires, discards the data.
- Next, the transmitting PDCP entity assigns (allocates) a COUNT value corresponding to TX_NEXT to the data arrived from the upper layer. The TX_NEXT may be set to an initial value of 0 and maintain the COUNT value of the next data (PDCP SDU) to be transmitted.
- If a header compression protocol is configured to the transmitting PDCP entity, the transmitting PDCP entity performs header compression of the data.
- If an integrity protection is configured to the transmitting PDCP entity, the transmitting PDCP entity generates a PDCP header and perform integrity protection of the PDCP header and data using a security key and the COUNT value of the TX_NEXT assigned to the data.
- Next, the transmitting PDCP entity performs a ciphering procedure using the security key for the data and the COUNT value of the TX_NEXT assigned to the data.
- Next, the transmitting PDCP entity sets least significant bits (LSBs) equal in length to a PDCP sequence number in the COUNT value of the TX_NEXT variable as the PDCP sequence number.
- Next, the transmitting PDCP entity increments the COUNT value of the TX_NEXT variable by 1 and sends the processed data prefixed with a PDCP header to the lower layers.

Figure 1F:
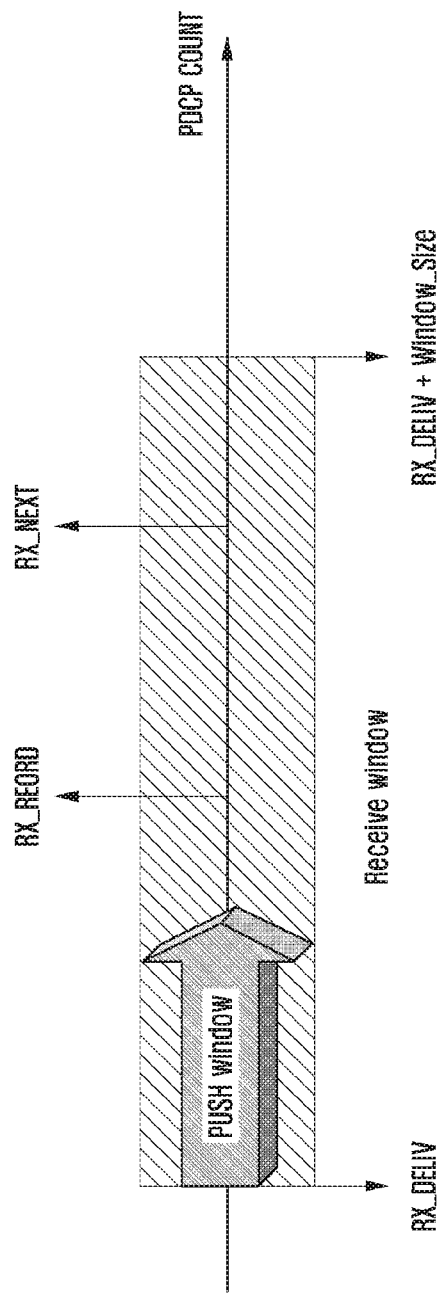
FIG. 1F illustrates a diagram for explaining an operation of a receiving PDCP entity according to a proposed embodiment.

FIG. 1F illustrates a diagram for explaining an operation of a receiving PDCP entity according to a proposed embodiment.

In a disclosed embodiment, the receiving PDCP entity operates as follows. The receiving PDCP entity maintains and manages 4 COUNT variables in processing received data. When processing the received data, the receiving PDCP entity uses a second COUNT variable maintaining the COUNT value of the next data (e.g., PDCP SDU) expected to be received, the second COUNT variable being referred to as RX_NEXT. When processing the received data, the receiving PDCP entity uses a third COUNT variable maintaining the COUNT value of the first data (e.g., PDCP SDU) that has not been delivered to the upper layers, the third COUNT variable being referred to as RX_DELIV. When processing the received data, the receiving PDCP entity uses a fourth COUNT variable maintaining the COUNT value of the data (e.g., PDCP SDU) that has triggered a PDCP reordering timer (t-Reordering), the fourth COUNT variable being referred to as RX_REORD. When processing the received data, the receiving PDCP entity may uses a fifth COUNT variable maintaining the COUNT value of the currently received data (e.g., PDCP SDU), the fifth COUNT variable being referred to as RCVE_COUNT. The PDCP reordering timer may be set to a timer value or period configured via an RRC message in the upper layer (RRC layer) as described in FIG. 1E and it is used for detecting lost PDCP PDUs, and only one timer can run at one timer.

Following variables are defined and used for the operations of the receiving PDCP entity of a UE.
- HFN: The Hyper Frame Number (HFN) part of the window state variable
- SN: The Sequence Number (SN) part of the window state variable
- RCVD_SN: The PDCP SN of the received PDCP PDU, included in PDU header
- RCVD_HFN: The HFN value of the received PDCP PDU, calculated by the receiving PDCP entity In a disclosed embodiment, the receiving PDCP entity operates as follows.

When a PDCP PDU is received from the lower layers, the receiving PDCP entity determines a COUNT value of the received PDCP PDU.
- If RCVD_SN<=SN(RX_DELIV)−Window_Size,
  - update RCVD_HFN to RCVD_HFN=HFN(RX_DELIV)+1,
- else if RCVD_SN>SN(RX_DELIV)+Window_Size,
  - update RCVD_HFN to RCVD_HFN=HFN(RX_DELIV)−1,
- else,
  - update RCVD_HFN to RCVD_HFN=HFN(RX_DELIV).
- The RCVD_COUNT is determined as RCVD_COUNT=[RCVD_HFN, RCVD_SN].

After determining the COUNT value of the received PDCP PDU, the receiving PDCP entity updates the window state variables and processes the PDCP PDU as follows.

The receiving PDCP entity performs deciphering and integrity verification of the PDCP PDU using the RCVD_COUNT value.

If integrity verification fails,
the receiving PDCP entity indicate the integrity verification failure to upper layers and discard the received PDCP PDU (data part of the PDCP PDU).

If RCVD_COUNT<RX_DELIV or if the PDCP_PDU with the RCVD_COUNT value has been received before (packet expired, outdated, or out of window, or duplicated packet),
the receiving PDCP entity discards the received PDCP Data PDU (data part of PDCP PDU).

If the received PDCP PDU is not discarded, the receiving PDCP entity operates as follows.

The receiving PDCP entity stores the processed PDCP SDU in the reception buffer.

if RCVD_COUNT>=RX_NEXT,
the receiving PDCP entity updates RX_NEXT to RCVD_COUNT+1.

If out-of-date delivery indicator (outOfOrderDelivery) is configured (if out-of-date delivery operation is indicated),
the receiving PDCP entity delivers the PDCP SDU to upper layers.

If RCVD_COUNT=RX_DELIV,
the receiving PDCP entity performs head compression, if not decompressed before, and delivers to upper layers in an order of the COUNT value.
The receiving PDCP entity delivers all stored PDCP SDUs with consecutive COUNT values starting from COUNT=RX_DELIV to the upper layer.
The receiving PDCP entity updates RX_DELIV value to the COUNT value of the first PDCP SDU that is equal to or greater than the current RX_DELIV and has not been delivered to the upper layers.

If the timer t-Reordering is running and if the RX_DELIV value is equal to or greater than RX_REORD,
the receiving PDCP entity stops and resets the timer t-Reordering.

If the timer t-Reordering is not running (includes the case where t-Reordering is stopped under the above condition) and if RX_DELIV is less than RX_NEXT,
the receiving PDCP entity updates RX_REORD value to RX_NEXT, and
starts the timer t-Reordering.

When the PDCP reordering timer (t-Reordering) expires, the receiving PDCP entity may operate as follows.
The receiving PDCP entity performs header decompression, if not decompressed before, and deliver to upper layers in an order of the COUNT values.
The receiving PDCP entity delivers all PDCP SDUs with COUNT values greater than the RX_REORD value.
The receiving PDCP entity delivers all PDCP SDUs with consecutive COUNT values starting from the RX_REORD value.
The receiving PDCP entity updates the RX_DELIV value to the COUNT value of the first PDCP SDU which has not been delivered to upper layers and of which the COUNT value is equal to or greater than the RX_REORD.
If the RX_DELIV value is less than the RX_NEXT value,
the receiving PDCP entity updates the RX_REORD value to the RX_NEXT value, and
starts timer t-Reordering.

Figure 1G:
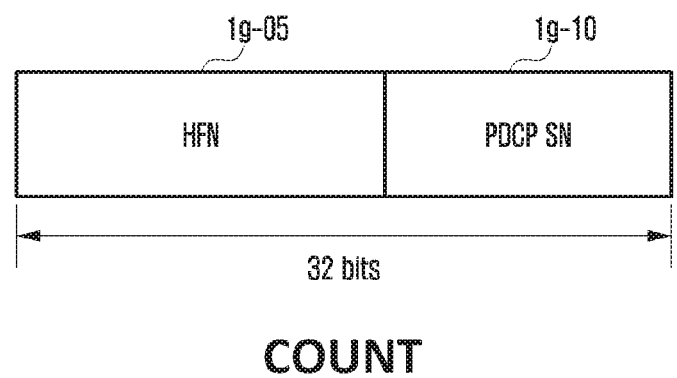
FIG. 1G illustrates a diagram of a format of a COUNT value for use in a next generation mobile communication system according to an embodiment of the disclosure.

FIG. 1G illustrates a diagram of a format of a COUNT value for use in a next generation mobile communication system according to an embodiment of the disclosure.

A PDCP entity maintains the COUNT value for ciphering and integrity protection between the UE and the base station and use the COUNT value as a parameter of a preconfigured ciphering and integrity protection algorithm in performing ciphering and integrity protection on a PDCP packet. The detailed description thereof is made with reference to FIG. 1G.

All PDCP packets (data packets and control message packets) have a PDCP sequence number (SN), which increments by 1 for every packet. If reaching a preconfigured PDCP SN size, the SN is recounted from 0 and HFN increases by 1. In this case, an SN that has been used before may be assigned to the current PDCP packet. If a hacker intercepts a PDCP SN value and attempts hacking into the communication between a UE and a base station using this previously used PDCP SN value, the PDCP data transmitted by the hacker may continuously increase the PDCP SN, resulting in HFY desynchronization problem between the transmitter and the receiver. Even if there is no hacking invasion, if a large amount of data are lost, this is likely to cause the HFN desynchronization problem and decoding failure of the received data.

The COUNT value has a length of 32 bits and consists of the HFN 1g-05 and the PDCP SN 1g-10. A UE and a base station maintain the COUNT value for use in ciphering and integrity protection. In actual data transmission, the PDCP packet (PDCP PDU) includes only the PDCP SN. Accordingly, it is difficult for a hacker to acquire an accurate COUNT value only with the PDCP SN communicating over a radio channel. The base station transmits to the UE an RRC message including PDCP configuration information indicative of a PDCP SN length set to 12 or 18 bits, and the PDCP SN length determines the HFN length in the COUNT value (32 bits—PDCP SN length).

Figure 1H:
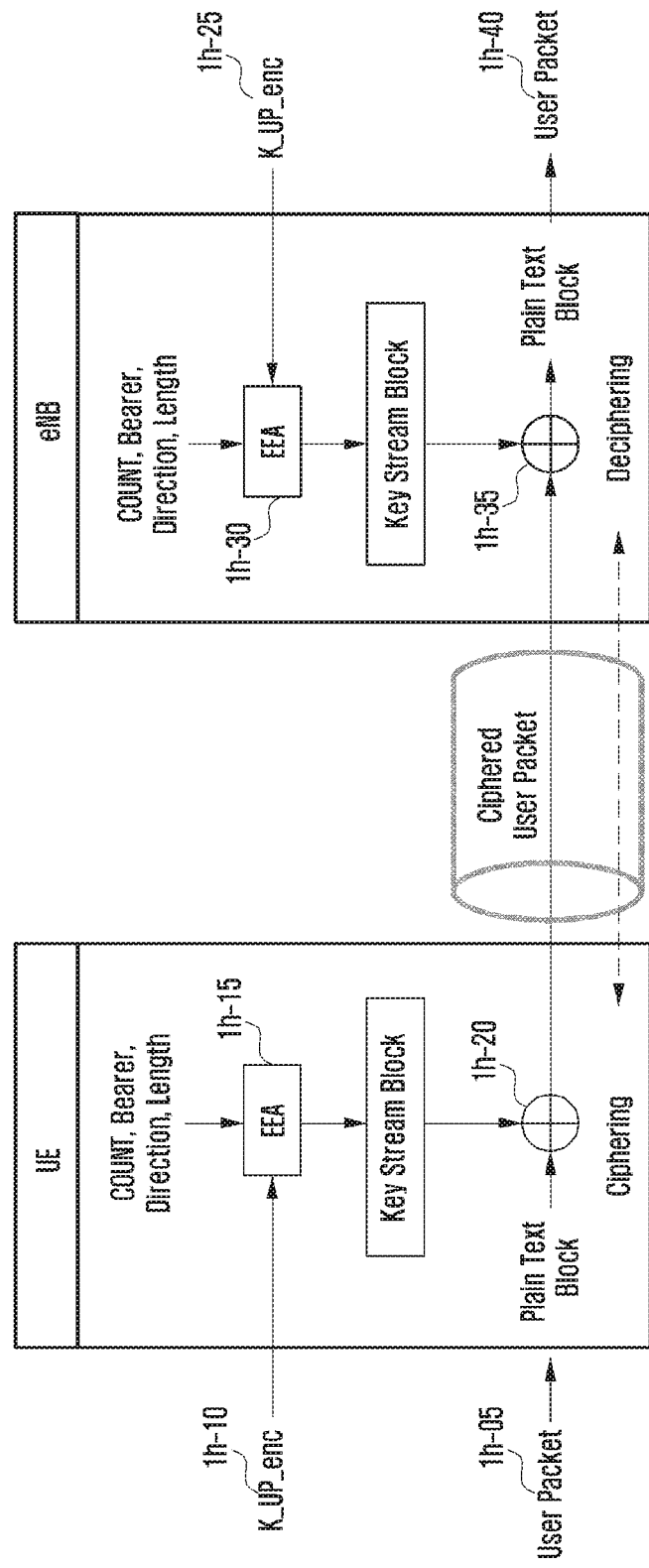
FIG. 1H illustrates a diagram for explaining a ciphering procedure of a PDCP entity, using a COUNT value, according to an embodiment of the disclosure.

FIG. 1H illustrates a diagram for explaining a ciphering procedure of a PDCP entity, using a COUNT value, according to an embodiment of the disclosure.

In reference to FIG. 1H, the transmitting PDCP entity performs ciphering on the data received from the upper layers, and the receiving PDCP entity performs deciphering on the data. In the next generation mobile communication system, all packets are transmitted/received without being ciphered before the AS security is activated; if the AS security is activated, all traffic (control data (CP) and user data (UP)) are ciphered before being transmitted. That is, as described with reference to FIG. 1E, after the securing configuration has been completed between the base station and the UE by exchanging the SecurityModeCommand and SecurityModeComplete messages, the RRC messages being exchanged between the base station and the terminal are ciphered and integrity-protected, and the corresponding IP packets are secured.

After AS security setup, if data arrive from upper layers at step 1h-05, the transmitting PDCP entity performs an exclusive operation on a key stream block acquired through a key generation algorithm (EPS Encryption Algorithm (EEA) for ciphering at the UE and a pure data block at step 1h-20 to generate a ciphered user packet. Here, the key stream block for use in ciphering may be acquired through a key generation algorithm with the input of parameters such as a key (K_UPenc 1h-10) for user plane ciphering that is obtained from K_gNB, COUNT (32-bit uplink NAS COUNT value), Bearer ID, Direction (message transmission direction 0 for uplink and 1 for downlink), and Length (key stream block length). If the user data packet encrypted by the transmitting PDCP entity is received, the receiving PDCP entity generates the same key stream block used for encryption by applying the same key generation algorithm applied by the UE and performs the exclusive operation thereon at step 1h-35. As in the terminal, the key stream block for use in deciphering, at the base station, may be acquired through a key generation algorithm with the input of parameters such as a key (K_UPenc 1h-10) for user plane ciphering that is obtained from K_gNB, COUNT (32-bit uplink NAS COUNT value), Bearer ID, Direction (message transmission direction 0 for uplink and 1 for downlink), and Length (key stream block length). The receiver may perform a deciphering procedure in the reverse order of the ciphering procedure of the transmitter.

In order to perform the ciphering and deciphering procedures precisely, the COUNT value stored in the UE and the base station should be accurate. That is, it is necessary to check whether the COUNT value is accurate to apply an accurate ciphering key to the PDCP packet to be ciphered. In order to accomplish this object, a disclosed embodiment proposes a method for a base station to instruct a UE to perform a COUNT CHECK operation in a next generation mobile communication system. That is, the UE verifies the validity of a COUNT value in response to a request from the base station and transmits, if the validity is verified, the current COUNT value to the base station.

FIG. 1I illustrates a signal flow diagram of a COUNT CHECK procedure proposed in an embodiment of the disclosure.

FIG. 1I shows the entire operation for a gNB 1i-02 to check for the COUNT value of the UE 1i-01, and the gNB 1e-02 may verify whether a COUNT value configured per bearer is valid and whether to synchronize the COUNT value through the proposed procedure.

In reference to FIG. 1I, the UE 1i-01 may establish an RRC connection with the gNB 1i-02 at step 1i-05. If necessary, e.g., if suspected of decoding failure or HFN desynchronization problem or data invasion by a hacker, the gNB 1i-02 transmits a CounterCheck RRC message to the UE 1i-01, at step 1i-10, to request for per-bearer COUNT check and report so as to determine whether the COUNT value is well synchronized between the transmitting PDCP entity and the receiving PDCP entity. This message may be carried by an RRCConnectionReconfiguration or RRCConnectionReestablishment message being transmitted on a dedicated common control channel (DCCH). The CounterCheck message may include a list of bearers (e.g., DRB or SRB) for per-bearer COUNT check, drb-CountMSB-InfoList, which contains DRB identifier, countMSB-Uplink (25 bit), and countMSB-Downlink (25 bit). That is, the list includes per-bearer identifiers of the bearers for which the COUNT check is required and 25 most significant bits (MSBs) of each of the uplink and downlink COUNT values of the gNB 1i-02 on the corresponding bearers.

Upon receipt of this message, the UE 1i-01 may compare the 25 MSBs of the uplink COUNT value (countMSB-Uplink) for the bearer identified by the bearer identifier included in the drb-CountMSB-InfoList of the message with the 25 MSBs of the uplink COUNT value stored in the UE 1i-01. The UE 1i-01 may also compare the 25 MSBs of the downlink COUNT value (countMSB-Uplink) for the bearer identified by the bearer identifier included in the drb-CountMSB-InfoList of the message with the 25 MSBs of the downlink COUNT value stored in the UE 1i-01. If it is determined that the two values, in downlink or uplink, are different from each other, the UE 1i-01 configures, at step 1i-15, a drb-CountInfoList for reporting 32-bit full COUNT values (full COUNT 32 bits) for the corresponding bearers and generates a Counter Check Response message including the identifiers of the bearers for which the compared values are different from each other and the 32-bit full COUNT values (full COUNT 32 bits). If it is determined that the 25 MSBs of the COUNT value (countMSB-Uplink or countMSB-Downlink) indicated by the eNB 1i-02 are all identical with those of the COUNT value stored in the UE 1i-01 in both the uplink and downlink, the corresponding values are not included in the reporting list.

At step 1i-15, the UE 1i-01 also configures a reporting list (drb-CountInfoList) for reporting the 32-bit full COUNT values (full COUNT 32 bits) for the bearers that are not indicated by the bearer identifiers in the drb-CountMSB-InfoList of the Count Check message received from the eNB 1i-02 and generates the Counter Check Response message including the 32-bit full COUNT values (full COUNT 32 bits) along with the identifiers of the non-indicated bearers.

After the per-bearer COUNT value comparison and report determination, the UE 1i-01 transmits, at step 1i-20, a CounterCheckResponse message including the reporting list configured at the previous step to the eNB 1i-02.

Hereinafter, a description is made of the operation of the UE 1i-01 for determining the COUNT values to compare and apply in comparing 25 MSBs of the COUNT values (countMSB-Uplink or countMSB-Downlink) indicated per bearer by the eNB 1i-02 in the COUNT CHECK procedure proposed in the embodiment of FIG. 1I.

According to a first embodiment, when the eNB 1i-02 transmits the Counter Check message indicating use of the 25 MSBs of the COUNT value (countMSB-Uplink or countMSB-Downlink), the UE 1i-01 determines COUNT values to be compared and reported as follows.

In the first embodiment, the UE 1i-01 uses, for uplink, the TX_NEXT value as the first COUNT variable maintaining the COUNT value of the next data to be transmitted by the transmitting PDCP entity for the case of comparing the countMSB-Uplink and the 25 MSBs and, for downlink, the second COUNT variable (RX_NEXT) maintaining the COUNT value of the next data (e.g., PDCP SDU) expected to be received among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message.

In the first embodiment, when the Counter Check message is received, the UE 1i-01 operates as follows.

For each established bearer (e.g., DRB),
  if there is no COUNT value for a given direction (uplink or downlink) because the bearer is a unidirectional bearer configured only in an opposite direction,
    the UE 1i-01 assumes that the COUNT value is 0 for the direction not in use.
  If the drb-CountMSB-InfoList does not include a bearer identifier of any bearer of the UE,
    the UE includes the bearer identifier of the bearer and the count-Uplink and count-Downlink values set respectively to TX_NEXT and RX_NEXT in the drb-CountInfoList of the Counter Check Response message.
  (if the drb-CountMSB-InfoList includes a bearer identifier of a bearer of the UE) if the 25 MSBs of the COUNT value (countMSB-Uplink or countMSB- Downlink) indicated in the drb-CountMSB-InfoList for at least one direction differs from the COUNT value (TX_NEXT or RX_NEXT) for the bearer of the UE, the UE includes the bearer identifier of the bearer and the count-Uplink and count-Downlink values set respectively to TX_NEXT and RX_NEXT in the drb-CountInfoList of the Counter Check Response message.

For each bearer (e.g., DRB) indicated in the drb-CountMSB-InfoList of the Counter Check message but not established, the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

According to a second embodiment, when the eNB 1*i*-02 transmits the Counter Check message indicating use of the 25 MSBs of the COUNT value (countMSB-Uplink or countMSB-Downlink), the UE i1-01 determines COUNT values to be compared and reported as follows.

In the second embodiment, the UE 1*i*-01 uses, for uplink, a value obtained by subtracting 1 from the TX_NEXT value as the first COUNT variable maintaining the COUNT value of the next data to be transmitted by the transmitting PDCP entity for the case of comparing the countMSB-Uplink and the 25 MSBs and, for downlink, a value obtained subtracting 1 from the second COUNT variable (RX_NEXT) maintaining the COUNT value of the next data (e.g., PDCP SDU) expected to be received among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message. Because the COUNT variables (TX_NEXT and RX_NEXT) indicate the COUNT values of the next data to be received or delivered, they should be subtracted by 1 to indicate the current COUNT value.

In the second embodiment, when the Counter Check message is received, the UE 1*i*-01 operates as follows.

For each established bearer (e.g., DRB), if there is no COUNT value for a given direction (uplink or downlink) because the bearer is a unidirectional bearer configured only in an opposite direction, the UE 1*i*-01 assumes that the COUNT value is 0 for the direction not in use.

If the drb-CountMSB-InfoList does not include a bearer identifier of any bearer of the UE, the UE includes the bearer identifier of the bearer and the count-Uplink and count-Downlink values set respectively to TX_NEXT-1 and RX_NEXT-1 in the drb-CountInfoList of the Counter Check Response message.

(if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_NEXT-1) for the bearer of the UE, the UE includes the bearer identifier of the bearer and the count-Uplink and count-Downlink values set respectively to TX_NEXT-1 and RX_NEXT-1 in the drb-CountInfoList of the Counter Check Response message.

For each bearer (e.g., DRB) indicated in the drb-CountMSB-InfoList of the Counter Check message but not established, the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

According to a third embodiment, when the eNB 1*i*-02 transmits the Counter Check message indicating use of the 25 MSBs of the COUNT value (countMSB-Uplink or countMSB-Downlink), the UE i1-01 determines COUNT values to be compared and reported as follows.

In the third embodiment, the UE 1*i*-01 uses, for uplink, the TX_NEXT value as the first COUNT variable maintaining the COUNT value of the next data to be transmitted by the transmitting PDCP entity for the case of comparing the countMSB-Uplink and the 25 MSBs and, for downlink, the third COUNT variable (RX_DELIV) maintaining the COUNT value of the first data (e.g., PDCP SDU) that has not been delivered to the upper layers among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message.

In the third embodiment, when the Counter check message is received, the UE 1*i*-01 operates as follows.

For each established bearer (e.g., DRB), if there is no COUNT value for a given direction (uplink or downlink) because the bearer is a unidirectional bearer configured only in an opposite direction, the UE 1*i*-01 assumes that the COUNT value is 0 for the direction not in use.

If the drb-CountMSB-InfoList does not include a bearer identifier of any bearer of the UE, the UE includes the bearer identifier of the bearer and the count-Uplink and count-Downlink values set respectively to TX_NEXT and RX_DELIV in the drb-CountInfoList of the Counter Check Response message.

(if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT or RX_DELIV) for the bearer of the UE, the UE includes the bearer identifier of the bearer and the count-Uplink and count-Downlink values set respectively to TX_NEXT and RX_DELIV in the drb-CountInfoList of the Counter Check Response message.

For each bearer (e.g., DRB) indicated in the drb-CountMSB-InfoList of the Counter Check message but not established,
> the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

According to a fourth embodiment, when the eNB 1i-02 transmits the Counter Check message indicating use of the 25 MSBs of the COUNT value (countMSB-Uplink or countMSB-Downlink), the UE i1-01 determines COUNT values to be compared and reported as follows.

In the fourth embodiment, the UE 1i-01 uses, for uplink, a value obtained by 1 from the TX_NEXT value as the first COUNT variable maintaining the COUNT value of the next data to be transmitted by the transmitting PDCP entity for the case of comparing the countMSB-Uplink and the 25 MSBs and, for downlink, a value obtained by subtracting 1 from the third COUNT variable (RX_DELIV) maintaining the COUNT value of the first data (e.g., PDCP SDU) that has not been delivered to the upper layers among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message. Because the COUNT variables (TX_NEXT and RX_DELIV) indicate the COUNT values of the next data to be received or delivered, they should be subtracted by 1 to indicate the current COUNT value.

In the fourth embodiment, when the Counter check message is received, the UE 1i-01 operates as follows.

For each established bearer (e.g., DRB),
> if there is no COUNT value for a given direction (uplink or downlink) because the bearer is a unidirectional bearer configured only in an opposite direction,
>> the UE 1i-01 assumes that the COUNT value is 0 for the direction not in use.
>
> If the drb-CountMSB-InfoList does not include a bearer identifier of any bearer of the UE,
>> the UE includes the bearer identifier of the bearer and the count-Uplink and count-Downlink values set respectively to TX_NEXT-1 and RX_DELIV-1 in the drb-CountInfoList of the Counter Check Response message.
>
> (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_DELIV-1) for the bearer of the UE,
>> the UE includes the bearer identifier of the bearer and the count-Uplink and count-Downlink values set respectively to TX_NEXT-1 and RX_DELIV-1 in the drb-CountInfoList of the Counter Check Response message.

For each bearer (e.g., DRB) indicated in the drb-CountMSB-InfoList of the Counter Check message but not established,
> the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

According to a fifth embodiment, when the eNB 1i-02 transmits the Counter Check message indicating use of the 25 MSBs of the COUNT value (countMSB-Uplink or countMSB-Downlink), the UE i1-01 determines COUNT values to be compared and reported as follows.

In the fifth embodiment, the UE 1i-01 uses, for uplink, the TX_NEXT value as the first COUNT variable maintaining the COUNT value of the next data to be transmitted by the transmitting PDCP entity for the case of comparing the countMSB-Uplink and the 25 MSBs and, for downlink, the fifth COUNT variable (RCVD_COUNT) maintaining the currently received COUNT among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message.

In the fifth embodiment, when the Counter check message is received, the UE 1i-01 operates as follows.

For each established bearer (e.g., DRB),
> if there is no COUNT value for a given direction (uplink or downlink) because the bearer is a unidirectional bearer configured only in an opposite direction,
>> the UE 1i-01 assumes that the COUNT value is 0 for the direction not in use.
>
> If the drb-CountMSB-InfoList does not include a bearer identifier of any bearer of the UE,
>> the UE includes the bearer identifier of the bearer and the count-Uplink and count-Downlink values set respectively to TX_NEXT and RCVD_COUNT in the drb-CountInfoList of the Counter Check Response message.
>
> (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT or RCVD_COUNT) for the bearer of the UE,
>> the UE includes the bearer identifier of the bearer and the count-Uplink and count-Downlink values set respectively to TX_NEXT and RCVD_COUNT in the drb-CountInfoList of the Counter Check Response message.

For each bearer (e.g., DRB) indicated in the drb-CountMSB-InfoList of the Counter Check message but not established,
> the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

According to a sixth embodiment, when the eNB 1i-02 transmits the Counter Check message indicating use of the 25 MSBs of the COUNT value (countMSB-Uplink or countMSB-Downlink), the UE i1-01 determines COUNT values to be compared and reported as follows.

In the sixth embodiment, the UE 1i-01 uses, for uplink, a value acquired by subtracting 1 from the TX_NEXT value as the first COUNT variable maintaining the COUNT value of the next data to be transmitted by the transmitting PDCP entity for the case of comparing the countMSB-Uplink and the 25 MSBs and, for downlink, a value acquired by subtracting 1 from the fifth COUNT variable (RCVD_COUNT) maintaining the currently received COUNT among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message. Because the COUNT variables (TX_NEXT and RCVD_COUNT) indicate the COUNT values of the next data to be received or delivered, they should be subtracted by 1 to indicate the current COUNT value.

In the sixth embodiment, when the Counter check message is received, the UE 1i-01 operates as follows.

For each established bearer (e.g., DRB),
  if there is no COUNT value for a given direction (uplink or downlink) because the bearer is a unidirectional bearer configured only in an opposite direction,
    the UE 1i-01 assumes that the COUNT value is 0 for the direction not in use.
  If the drb-CountMSB-InfoList does not include a bearer identifier of any bearer of the UE,
    the UE includes the bearer identifier of the bearer and the count-Uplink and count-Downlink values set respectively to TX_NEXT-1 and RCVD_COUNT-1 in the drb-CountInfoList of the Counter Check Response message.
  (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RCVD_COUNT-1) for the bearer of the UE,
    the UE includes the bearer identifier of the bearer and the count-Uplink and count-Downlink values set respectively to TX_NEXT-1 and RCVD_COUNT-1 in the drb-CountInfoList of the Counter Check Response message.
For each bearer (e.g., DRB) indicated in the drb-CountMSB-InfoList of the Counter Check message but not established,
  the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

The first to sixth embodiments of the disclosure are directed to the COUNT check procedures in which an NR PDCP entity is established per data bearer in the UE 1i-01. However, the UE 1i-01 accessible to both the LTE eNB and NR gNB may be configured to have an NR PDCP entity or an LTE PDCP entity per data bearer with the version change of the PDCP entity. In this case, the method for selecting the COUNT values to be compared and reported in the counter check procedure may vary according to whether the PDCP entity configured for each bearer (DRB) is the NR PDCP entity or the LTE PDCP entity.

Hereinafter, a description is made of the method for selecting a COUNT value to be compared and reported differently according to whether the PDCP entity configured for each bearer (e.g., DRB) is an NR PDCP entity or an LTE PDCP entity.

According to a seventh embodiment, when the eNB 1i-02 transmits the Counter Check message indicating use of the 25 MSBs of the COUNT value (countMSB-Uplink or countMSB-Downlink), the UE i1-01 determines COUNT values to be compared and reported according to whether the PDCP entity configured per bearer is an LTE PDCP entity or an NR PDCP entity as follows.

In the seventh embodiment, if an NR PDCP entity is configured for a bearer, the UE 1i-01 uses, for uplink, a value acquired by subtracting 1 form the TX_NEXT value as the first COUNT variable maintaining the COUNT value of the next data to be transmitted by the transmitting PDCP entity for the case of comparing the countMSB-Uplink and the 25 MSBs and, for downlink, a value acquired by subtracting 1 from the second COUNT variable (RX_NEXT) maintaining the COUNT value of the next data (e.g., PDCP SDU) expected to be received among 4 COUNT variables (i.e., the first COUNT variable (RX_NEXT), the third COUNT variable (RX_DELIV), the fourth COUNT variable (RX_REORD), and the fifth COUNT variable (RCVD_COUNT)) in use by the receiving PDCP entity for the case of comparing the countMSB-Downlink and the 25 MSBs and reporting the COUNT values via the Counter Check Response message. Because the COUNT variables (TX_NEXT and RX_NEXT) indicate the COUNT values of the next data to be received or delivered, they should be subtracted by 1 to indicate the current COUNT value.

In the seventh embodiment, if an NR PDCP entity is configured for a bearer, the UE 1i-01 uses, for uplink, a value acquired by subtracting 1 from the Next_PDCP_TX_SN value as the first window variable maintaining the PDCP SN of the next data to be transmitted by the transmitting PDCP entity and a COUNT value generated based on the TX_HFN variable maintaining the HFN value of the transmitter for the case of comparing the countMSB-Uplink and the 25 MSBs and, for downlink, a value acquired by subtracting 1 from the second window variable (Next_PDCP_RX_SN) maintaining the PDCP SN value of the next data (e.g., PDCP SDU) expected to be received among 3 window variables (i.e., the second window variable (Next_PDCP_RX_SN indicating the PDCP SN of the next data expected to be received), the third window variable (Last_Submitted_PDCP_RX_SN indicating PDCP SN of last data delivered to upper layers), and the fourth window variable (Reordering_PDCP_RX_COUNT indicating COUNT value triggering a timer)) in use by the receiving PDCP entity and a COUNT value generated based on the RX_HFN variable maintaining the HFN value of the receiver for the case of comparing the countMSB-Downlink and the 25 MSBs and reporting the COUNT values via the Counter Check Response message. Because the window variables (Next_PDCP_TX_SN and Next_PDCP_RX_SN) indicate the PDCP SN values of the next data to be received or delivered, they should be subtracted by 1 to indicate the current PDCP SN value.

In the seventh embodiment, when the Counter check message is received, the UE 1i-01 operates as follows.

For each established bearer (e.g., DRB),
  if there is no COUNT value for a given direction (uplink or downlink) because the bearer is a unidirectional bearer configured only in an opposite direction,
    the UE 1i-01 assumes that the COUNT value is 0 for the direction not in use.
  If the drb-CountMSB-InfoList does not include a bearer identifier of any bearer of the UE and if an LTE PDCP entity is configured for the bearer identified by the bearer identifier,
    the UE includes the bearer identifier of the bearer and the count-Uplink and count-Downlink values set respectively to the COUNT value based on the TX_HFN and Next_PDCP_TX_SN−1 and the COUNT value based on the RX_HFN and Next_PDCP_RX_SN−1 in the drb-CountInfoList of the Counter Check Response message.
  (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_NEXT-1) for the bearer of the UE and if an LTE PDCP entity is configured for the bearer,
    the UE includes the bearer identifier of the bearer and the count-Uplink and count-Downlink values set respectively to the COUNT value based on the TX_HFN and Next_PDCP_TX_SN−1 and the COUNT value based on the RX_HFN and Next_PDCP_RX_SN−1 in the drb-CountInfoList of the Counter Check Response message.
  If the drb-CountMSB-InfoList does not include a bearer identifier of any bearer of the UE and if an NR PDCP entity is configured for the bearer identified by the bearer identifier,
    the UE includes the bearer identifier of the bearer and the count-Uplink and count-Downlink values set respectively to TX_NEXT-1 and RX_NEXT-1.
  (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_NEXT-1) for the bearer of the UE and if an NR PDCP entity is configured for the bearer,
    the UE includes the bearer identifier of the bearer and the count-Uplink and count-Downlink values set respectively to TX_NEXT-1 and RX_NEXT-1 in the drb-CountInfoList of the Counter Check Response message.
  For each bearer (e.g., DRB) indicated in the drb-CountMSB-InfoList of the Counter Check message but not established,
    the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.

The Counter Check Response message configured as above is sent to low layers for transmission.

Hereinafter, a description is made of the method for selecting a COUNT value to be compared and reported regardless of whether the PDCP entity configured per bearer (e.g., DRB) is an NR PDCP entity or an LTE PDCP entity.

According to an eighth embodiment, when the eNB 1i-02 transmits the Counter Check message indicating use of the 25 MSBs of the COUNT value (countMSB-Uplink or countMSB-Downlink), the UE i1-01 determines COUNT values to be compared and reported regardless of whether the PDCP entity configured per bearer is an LTE PDCP entity or an NR PDCP entity as follows.

In the eighth embodiment, the UE 1i-01 uses, for uplink, a COUNT value corresponding to the data with the highest (or largest) PDCP SN among the data (e.g., PDCP SDUs or PDCP PDUs) transmitted by the transmitting PDCP entity until then for the case of comparing the countMSB-Uplink and the 25 MSBs and, for downlink, a COUNT value corresponding to the data with the highest (or largest) PDCP SN among the data (e.g., PDCP SDUs or PDCP PDUs) received by the receiving PDCP entity until then for the case of comparing the countMSB-Downlink and the 25 MSBs and reporting the COUNT values via the Counter Check Response message.

In the eighth embodiment, when the Counter check message is received, the UE 1i-01 operates as follows.

For each established bearer (e.g., DRB),
  if there is no COUNT value for a given direction (uplink or downlink) because the bearer is a unidirectional bearer configured only in an opposite direction,
    the UE 1i-01 assumes that the COUNT value is 0 for the direction not in use.
  If the drb-CountMSB-InfoList does not include a bearer identifier of any bearer of the UE and if an LTE PDCP entity is configured for the bearer identified by the bearer identifier,
    the UE includes the bearer identifier of the bearer and the count-Uplink and count-Downlink values set respectively to the COUNT value corresponding to the data with the highest (or largest) PDCP SN among the data (e.g., PDCP SDUs or PDCP PDUs) transmitted until then and the COUNT value corresponding to the data with the highest (or largest) PDCP SN among the data (e.g., PDCP SDUs or PDCP PDUs) received until then in the drb-CountInfoList of the Counter Check Response message.
  (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_NEXT-1) for the bearer of the UE and if an LTE PDCP entity is configured for the bearer,
    the UE includes the bearer identifier of the bearer and the count-Uplink and count-Downlink values set respectively to the COUNT value corresponding to the data with the highest (or largest) PDCP SN among the data (e.g., PDCP SDUs or PDCP PDUs) transmitted until then and the COUNT value corresponding to the data with the highest (or largest) PDCP SN among the data (e.g., PDCP SDUs or PDCP PDUs) received until then in the drb-CountInfoList of the Counter Check Response message.
For each bearer (e.g., DRB) indicated in the drb-CountMSB-InfoList of the Counter Check message but not established,
    the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.
The Counter Check Response message configured as above is sent to low layers for transmission.

Hereinafter, a description is made of the Counter check procedure for the terminal 1i-01 accessible only to the LTE eNB. That is, a method for the UE 1i-01 allowed for establishing only per-bearer (e.g., DRB) LTE PDCP entities to select and report COUNT values.

According to a ninth embodiment, when the eNB 1i-02 transmits the Counter Check message indicating use of the 25 MSBs of the COUNT value (countMSB-Uplink or countMSB-Downlink), the UE i1-01 configured with an LTE PDCP entity per bearer determines COUNT values to be compared and reported as follows.

In the ninth embodiment, because an LTE PDCP entity is configured per bearer, the UE 1i-01 uses, for uplink, a value acquired by subtracting 1 from the Next_PDCP_TX_SN value as the first window variable maintaining the PDCP SN of the next data to be transmitted by the transmitting PDCP entity and a COUNT value generated based on the TX_HFN variable maintaining the HFN value of the transmitter for the case of comparing the countMSB-Uplink and the 25 MSBs and, for downlink, a value acquired by subtracting 1 from the second window variable (Next_PDCP_RX_SN) maintaining the PDCP SN value of the next data (e.g., PDCP SDU) expected to be received among 3 window variables (i.e., the second window variable (Next_PDCP_RX_SN indicating the PDCP SN of the next data expected to be received), the third window variable (Last_Submitted_PDCP_RX_SN indicating PDCP SN of last data delivered to upper layers), and the fourth window variable (Reordering_PDCP_RX_COUNT indicating COUNT value triggering a timer)) in use by the receiving PDCP entity and a COUNT value generated based on the RX_HFN variable maintaining the HFN value of the receiver for the case of comparing the countMSB-Downlink and the 25 MSBs and reporting the COUNT values via the Counter Check Response message. Because the window variables (Next_PDCP_TX_SN and Next_PDCP_RX_SN) indicate the PDCP SN values of the next data to be received or delivered, they should be subtracted by 1 to indicate the current PDCP SN value.

In the ninth embodiment, when the Counter check message is received, the UE 1i-01 operates as follows.
For each established bearer (e.g., DRB),
    if there is no COUNT value for a given direction (uplink or downlink) because the bearer is a unidirectional bearer configured only in an opposite direction,
        the UE 1i-01 assumes that the COUNT value is 0 for the direction not in use.
    If the drb-CountMSB-InfoList does not include a bearer identifier of any bearer of the UE,
        the UE includes the bearer identifier of the bearer and the count-Uplink and count-Downlink values set respectively to the COUNT value based on the TX_HFN and Next_PDCP_TX_SN−1 and the COUNT value based on the RX_HFN and Next_PDCP_RX_SN−1 in the drb-CountInfoList of the Counter Check Response message.
    (if the drb-CountMSB-InfoList includes a bearer identifier of a bearer of the UE) if the 25 MSBs of the COUNT value (countMSB-Uplink or countMSB-Downlink) indicated in the drb-CountMSB-InfoList for at least one direction differs from the COUNT value (TX_NEXT-1 or RX_NEXT-1) for the bearer of the UE,
        the UE includes the bearer identifier of the bearer and the count-Uplink and count-Downlink values set respectively to the COUNT value based on the TX_HFN and Next_PDCP_TX_SN−1 and the COUNT value based on the RX_HFN and Next_PDCP_RX_SN−1 in the drb-CountInfoList of the Counter Check Response message.
For each bearer (e.g., DRB) indicated in the drb-CountMSB-InfoList of the Counter Check message but not established,
    the UE includes the bearer identifier of the bearer and count-Uplink 25 MSBs of the countMSB-Uplink and countMSB-Downlink set respectively to be equal to the 25 MSBs of the countMSB-Uplink or countMSB-Downlink indicated in the drb-CountMSB-InfoList along with the 7 least significant bits (LSBs) set to 0 in the drb-CountInfoList of the Counter Check response message.
The Counter Check Response message configured as above is sent to low layers for transmission.

Figure 1J:
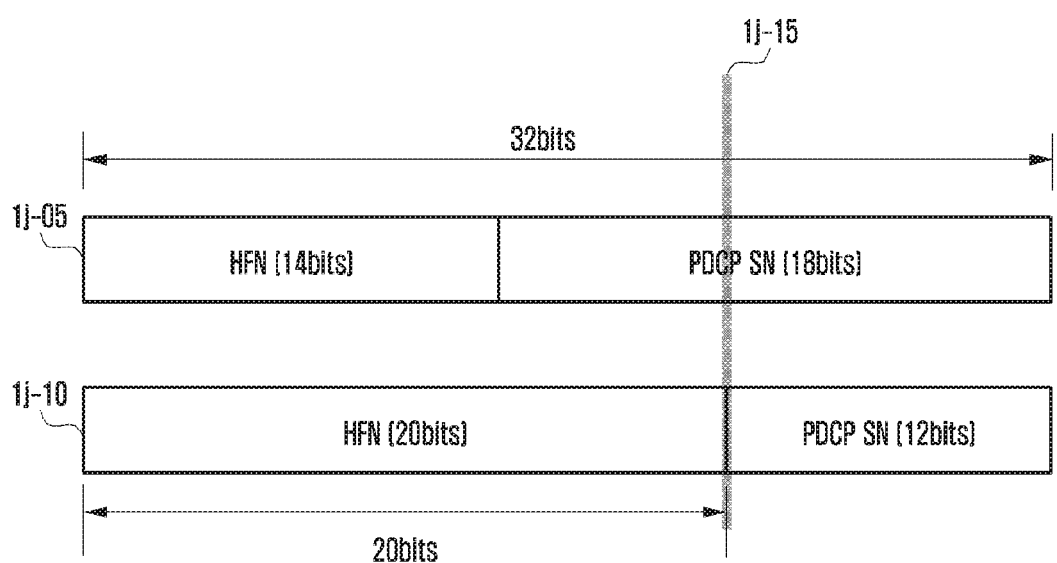
FIG. 1J illustrates a diagram for explaining a method for reducing a size of MSBs of a COUNT value indicated in a proposed Counter check procedure according to an embodiment of the disclosure.

FIG. 1J illustrates a diagram for explaining a method for reducing a size of MSBs of a COUNT value indicated in a proposed Counter check procedure according to an embodiment of the disclosure.

The proposed Counter check procedure aims to check for the HFN value of per-bearer COUNT value. Accordingly, the size of the MSBs of the COUNT value indicated by the gNB 1i-02 may be dramatically reduced according to the length of a configurable PDCP SN. As aforementioned, in the next generation mobile communication system, the length of the PDCP SN may be set to 12 bits in the case as denoted by reference number 1j-05 or 18 bits in the case as denoted by reference number 1j-10. For all bearers, 20 MSBs of the COUNT value are enough even when comparing HFN values as denoted by reference number 1j-15. Instead of using 25 MSBs of the COUNT value as described in the above Count check procedures, if 20 MSBs of the COUNT value is used, it is possible to reduce overhead by 5 bits×number of bearers. It may also be possible to further reduce the header overhead by setting the number of MSBs to (32 bits−PDCP SN length per bearer).

Given that an RLC entity supports 6-bit RLC SN, if a new PDCP SN length of 6 bits is introduced for reducing the header overhead, the HFN occupying the 25 MSBs of the COUNT may be extended to 26 bits in the above Count check procedure for comparison accuracy.

The proposed Counter check procedure may be applied when a Counter check message transmitted on SRB1 in use by the gNB 1$i$-02 corresponding to a master cell group (MCG).

Hereinafter, a description is made of the operation of a UE when the UE receives a Counter check message transmitted on SRB3 in use by the gNB 1$i$-02 corresponding to a secondary cell group (SCG) rather than an MCG. The description is made with reference to FIG. 1I. The UE operations of determining the COUNT values to be compared and reported upon receipt of the Counter Check message indicating use of 25 MSBs of the COUNT value (countMSB-Uplink or countMSB-Downlink) from the eNB 1$i$-02 according to the first to sixth embodiments are applicable to the Count check procedure in which the Counter check message is transmitted on SRB3 in use by an SCG. The method for reducing overhead of MSBs of the COUNT value, as described with reference to FIG. 1J, may also be applicable to the Count check procedure in which the Counter check message is transmitted on SRB3 in use by an SCG.

In the case where an RRC connection is established between the UE 1$i$-01 and the gNB 1$i$-02, the gNB 1$i$-02 transmits a CounterCheck RRC message to the UE 1$i$-01 at step 1$i$-10 to request for per-DRB COUNT check and report. This message may be carried by an RRCConnectionReconfiguration or RRCConnectionReestablishment message being transmitted on a dedicated common control channel (DCCH). The CounterCheck message may include a list of bearers (e.g., DRB or SRB) for per-bearer COUNT check, drb-CountMSB-InfoList, which contains DRB identifier, countMSB-Uplink (25 bit), and countMSB-Downlink (25 bit). That is, the list includes per-bearer identifiers of the bearers for which the COUNT check is required and 25 most significant bits (MSBs) of each of the uplink and downlink COUNT values of the gNB 1$i$-02 on the corresponding bearers. Meanwhile, the gNB 1$i$-02 may transmit the CounterCheck message on SRB1 or SRB3. That is, the COUNT CHECK request may be made through an MCG SRB (e.g., SRB1) for the case where the UE 1$i$-01 is connected to the MCG or through an SCG SRB (e.g., SRB3) for the case where the UE 1$i$-01 is connected to the SCG. The COUNT CHECK request may also be made simultaneously through both SRB1 and SRB3.

The UE 1$i$-01 determines whether the CounterCheck message has been received on SRB1 or SRB3 and performs a subsequent operation at step 1$i$-15 as follows.

Receipt on SRB1 (first operation): The UE generates a COUNT CHECK RESPONSE message including full COUNTs of the first and third DRB groups.

Receipt on SRB3 (second operation): The UE generate a COUNT CHECK RESPONSE message including full COUNTs of the second DRB and third DRB groups.

The DRB groups for use in the first and second operations are defined as follows.

First DRB group: A set of DRBs that are not included in drb-CountMSB-InfoList among MCG bearers (or MCG terminated bearers, i.e., bearers for which a PDCP entity exists in MCG) and MCG split bearers.

Second DRB group: A set of DRBs that are not included in drb-CountMSB-InfoList among SCG bearers (or SCG terminated bearers, i.e., bearers for which a PDCP entity exists in SCG) and SCG split bearers.

Third DRB group: A set of DRBs with 25 MSBs that are not matched among DRBs included in drb-CountMSB-InfoList.

For example, if the CounterCheck message is received through SRB1, the UE 1$i$-01 includes full COUNT values for the DRBs that are not included in the configured DRB list among the MCG bearers and MCG split bearers and for the DRBs with non-matching result of comparison between the 25 MSBs for the DRBs configured in the received CounterCheck message and the 25 MSBs (in both countMSB-Uplink for uplink and countMSB-Downlink for downlink) stored in the UE 1$i$-01. If the COUNT value transmitted by the gNB 1$i$-02 matches the COUNT value calculated by the UE 1$i$-01, the corresponding COUNT value is not included in the reporting list.

Here, it is necessary to select a PDCP SDU of which COUNT value is to be compared with a value (countMSB-Uplink (25 bits) or countMSB-Downlink (25 bits)) configured in the CounterCheck message. The UE 1$i$-01 may use one of two methods as follows:

selecting the PDCP SDU with the highest COUNT (NEXT_RX_COUNT−1) among the PDCP SDUs received until then; and selecting PDCP SDU with the highest COUNT among PDCP SDUs reordered until then.

It is also necessary to select a PDCP SDU of which COUNT value is reported. The UE 1$i$-01 may use one of three methods as follows:

selecting the PDCP SDU with a matching result of COUNT value comparison;

selecting the PDCP SDU with the highest COUNT value at reporting time point; and selecting the PDCP SDU with the highest COUNT value among PDCP SDUs reordered at reporting time point.

After generating the CountCheck result information as above, the UE 1$i$-01 transmits, at step 1$i$-20, an RRC message (CounterCheckResponse) including the corresponding information to the gNB 1$i$-01.

Figure 1K:
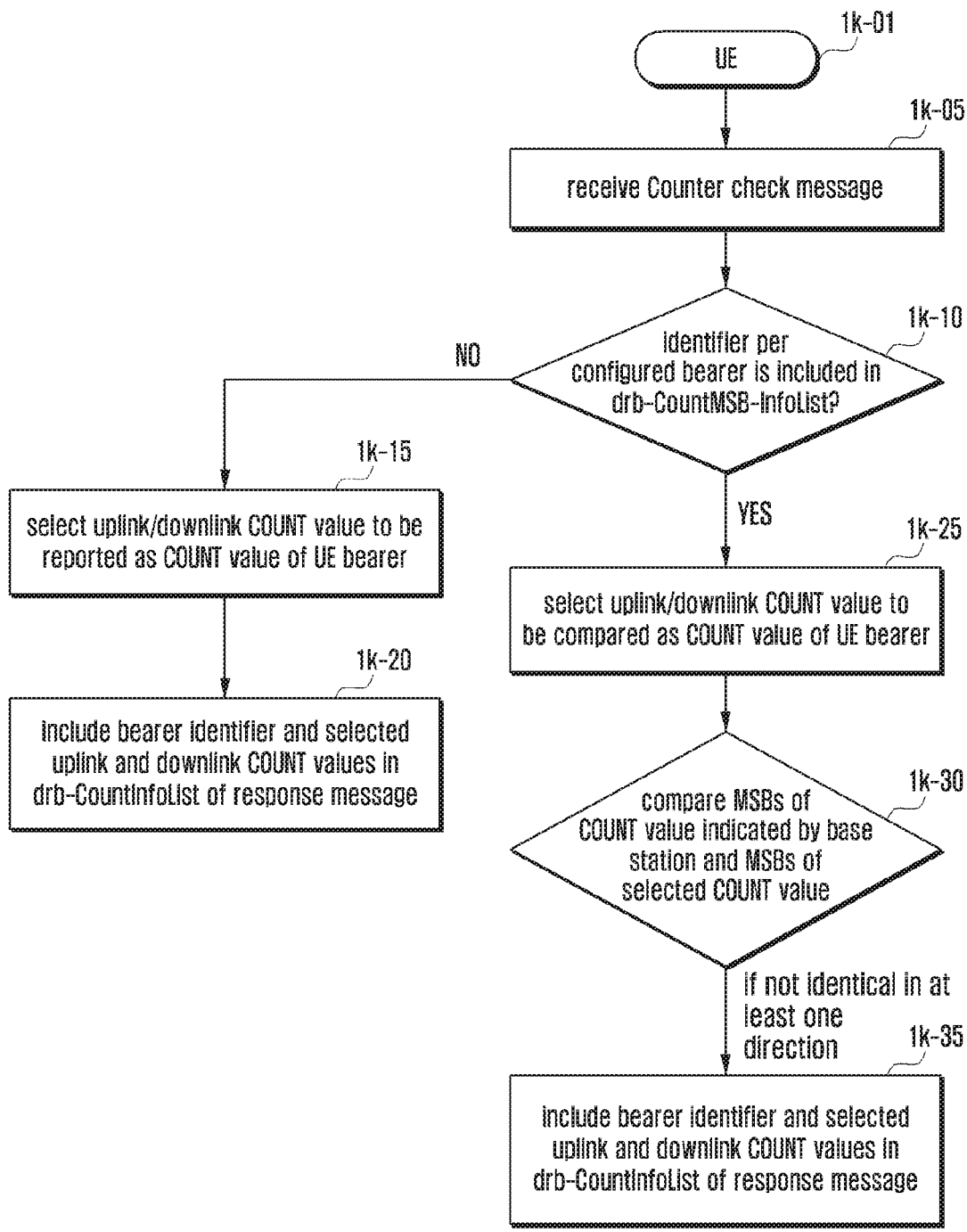
FIG. 1K illustrates a flowchart of an operation of a UE in a proposed Counter check procedure according to an embodiment of the disclosure.

FIG. 1K illustrates a flowchart of an operation of a UE in a proposed Counter check procedure according to an embodiment of the disclosure.

In FIG. 1K, the UE receives an RRC message, i.e., a Counter check message, at step 1$k$-05; upon receipt of this message, the UE determines at step 1$k$-10 whether the drb-CountMSB-InfoList includes a bearer identifier per bearer (e.g., DRB) established for the UE. If it is determined that the drb-CountMSB-InfoList does not include a bearer identifier of any bearer for the UE, the UE selects countUplink and count-Downlink values at step 1$k$-15 according to one of the first to sixth embodiments and includes the bearer identifiers of the corresponding bearers and the selected uplink and downlink COUNT values in the drb-CountInfoList of a Counter Check Response message at step 1$k$-20.

If it is determined that the drb-CountMSB-InfoList includes a bearer identifier of any bearer for the UE, the UE selects the uplink and downlink COUNT values at step 1$k$-25 according to one of the first to sixth embodiments and compares, at step 1$k$-30, the selected COUNT values with MSBs of the COUNT value that is indicated by the base station.

If the 25 MSBs of the COUNT value (countMSB-Uplink or countMSB-Downlink) differs from the COUNT value (uplink or downlink COUNT value) for the bearer that is selected by the UE in at least one direction, the UE includes the bearer identifier of the corresponding bearer and the selected uplink and downlink COUNT values in the drb-CountInfoList of the Counter Check Response message at step 1k-35.

Figure 1L:
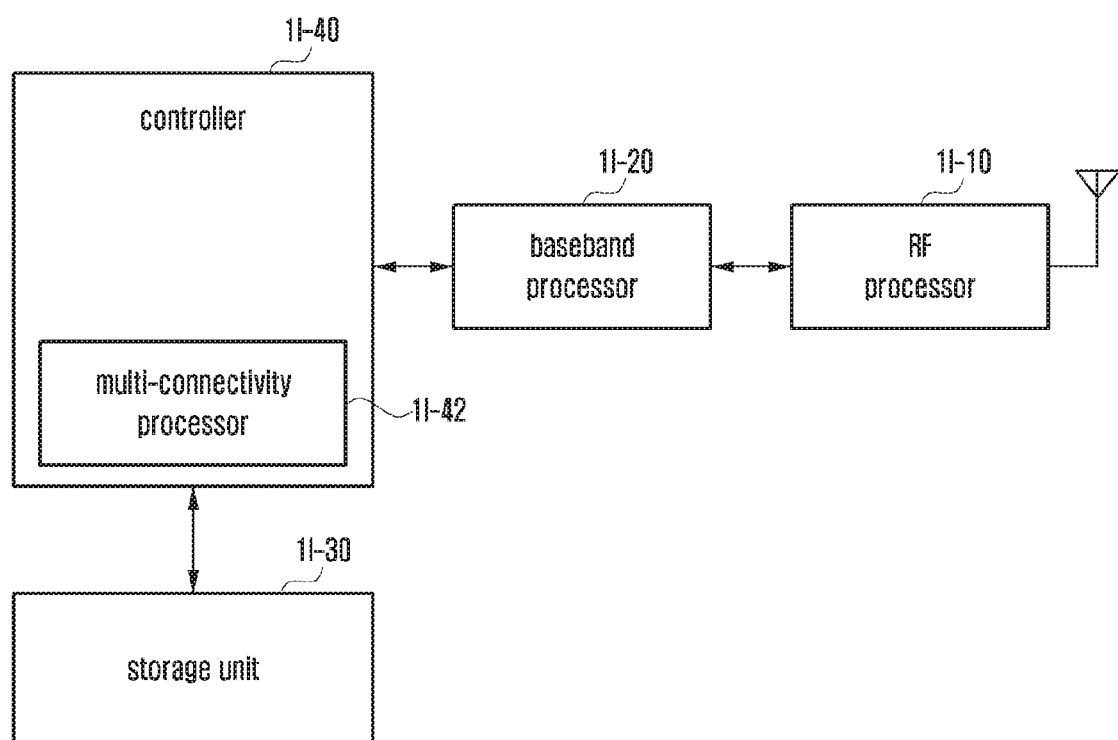
FIG. 1L illustrates a block diagram of a configuration of a UE according to an embodiment of the disclosure.

FIG. 1L illustrates a block diagram of a configuration of a UE according to an embodiment of the disclosure.

In reference to FIG. 1L, the UE includes a radio frequency (RF) processor 1l-10, a baseband processor 1l-20, a storage unit 1l-30, and a controller 1l-40.

The RF processor 1l-10 has a function for transmitting/receiving a signal over a radio channel such as band conversion and amplification of the signal. That is, the RF processing unit 1l-10 up-converts a baseband signal from the baseband processor 1l-20 to an RF band signal and transmits the RF signal via an antenna and down-converts the RF signal received via the antenna to a baseband signal. For example, the RF processor 1l-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 1l-10 may also include a plurality of RF chains. The RF processor 1l-10 may perform beamforming. For beamforming, the RF processor 1l-10 may adjust the phase and size of a signal to be transmitted/received by means of the antennas or antenna elements. The RF processor 1l-10 may be configured to support a MIMO scheme with which the UE can receive multiple layers simultaneously. The RF processor 1l-10 may configure the plurality of antennas or antenna elements appropriately, under the control of the controller 1l-40, to perform beam sweeping and adjust the beam direction and beam width to achieve an alignment of the reception and transmission beam.

The baseband processor 1l-20 has a baseband signal-bit string conversion function according to a physical layer standard of the system. For example, in a data transmission mode, the baseband processor 1l-20 performs encoding and modulation on the transmission bit string to generate complex symbols. In a data reception mode, the baseband processor 1l-20 performs demodulation and decoding on the baseband signal from the RF processor 1l-10 to recover the transmitted bit string. In the case of using an OFDM scheme for data transmission, the baseband processor 1l-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1l-20 splits the baseband signal from the RF processor 1l-10 into OFDM symbols, perform fast Fourier transform (FFT) on the OFDM symbols to recover the signals mapped to the subcarriers, and performs demodulation and decoding on the signals to recover the transmitted bit string.

The baseband processor 1l-20 and the RF processor 1l-10 process the transmission and reception signals as described above. Accordingly, the baseband processor 1l-20 and the RF processor 1l-10 may be referred to as a transmitter, a receiver, a transceiver, or a communication unit/circuit. At least one of the baseband processor 1l-20 and the RF processor 1l-10 may include a plurality of communication modules for supporting different radio access technologies. At least one of the baseband processor 1l-20 and the RF processor 1l-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.2 GHz and 2 GHz bands) and an mmWave band (e.g., 60 GHz).

The storage unit 1l-30 stores data such as basic programs for operation of the UE, application programs, and setting information. The storage unit 1l-30 provides the stored information in response to a request from the controller 1l-40.

The controller 1l-40 controls overall operations of the UE. For example, the controller 1l-40 controls the baseband processor 1l-20 and the RF processor 1l-10 for transmitting and receiving signals. The controller 1l-40 writes and reads data to and from the storage unit 1l-40. For this purpose, the controller 1l-40 may include at least one processor. For example, the controller 1l-40 may include a communication processor (CP) for controlling communications and an application processor (AP) for controlling higher layer programs such as applications. The controller 1l-40 may be electrically connected to the transceiver.

Figure 1M:
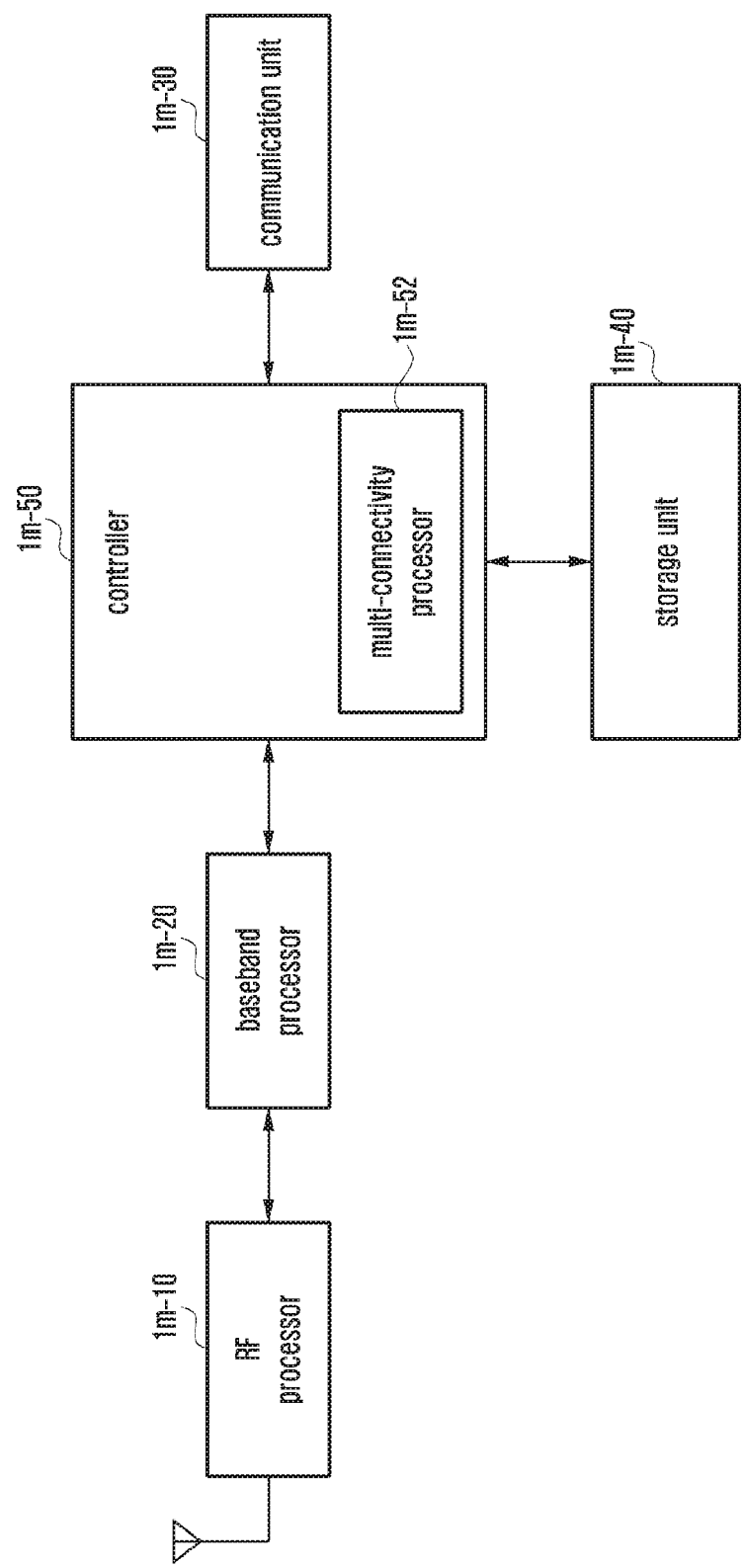
FIG. 1M illustrates a block diagram of a configuration of a base station in a wireless communication according to an embodiment of the disclosure.

FIG. 1M illustrates a block diagram of a configuration of a base station in a wireless communication according to an embodiment of the disclosure.

In reference to FIG. 1M, the base station includes an RF processor 1m-10, a baseband processor 1m-20, a backhaul communication unit 1m-30, a storage unit 1m-40, and a controller 1m-50.

The RF processor 1m-10 has a function for transmitting/receiving a signal over a radio channel such as band conversion and amplification of the signal. That is, the RF processing unit 1m-10 up-converts a baseband signal from the baseband processor 1m-20 to an RF band signal and transmits the RF signal via an antenna and down-converts the RF signal received via the antenna to a baseband signal. For example, the RF processor 1m-10 may include a transmission filter, a reception filter, an amplifier, a mixer, an oscillator, a DAC, and an ADC. Although one antenna is depicted in the drawing, the base station may be provided with a plurality of antennas. The RF processor 1m-10 may also include a plurality of RF chains. The RF processor 1i-10 may perform beamforming. For beamforming, the RF processor 1m-10 may adjust the phase and size of a signal to be transmitted/received by means of the antennas or antenna elements. The RF processor 1m-10 may be configured to transmit one or more layers for a downlink MIMO operation.

The baseband processor 1m-20 has a baseband signal-bit string conversion function according to a physical layer standard of the system. For example, in a data transmission mode, the baseband processor 1m-20 performs encoding and modulation on the transmission bit string to generate complex symbols. In a data reception mode, the baseband processor 1m-20 performs demodulation and decoding on the baseband signal from the RF processor 1m-10 to recover the transmitted bit string. In the case of using an OFDM scheme for data transmission, the baseband processor 1m-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1m-20 splits the baseband signal from the RF processor 1m-10 into OFDM symbols, performs fast Fourier transform (FFT) on the OFDM symbols to recover the signals mapped to the subcarriers, and performs demodulation and decoding on the signals to recover the transmitted bit string. The baseband processor 1m-20 and the RF processor 1m-10 process the transmission and reception signals as described above. Accordingly, the baseband processor 1m-20 and the RF processor 1m-10 may be referred to as a transmitter, a receiver, a transceiver, or a communication unit.

The communication unit 1m-30 provides an interface for communication with other nodes in the network.

The storage unit 1m-40 stores data such as basic programs for operation of the base station, application programs, and setting information. The storage unit 1m-40 may also store the information on the bearers established for UEs and measurement results reported by the connected UEs. The storage unit 1m-40 may also store the information for use by a UE in determining whether to enable or disable multi-connectivity. The storage unit 1m-40 may provide the stored data in reference to a request from the controller 1m-50.

The controller 1m-50 controls overall operations of the base station. For example, the controller 1m-50 controls the baseband processor 1m-20, the RF processor 1m-10, and the backhaul communication unit 1m-30 for transmitting and receiving signals. The controller 1m-50 writes and reads data to and from the storage unit 1m-40. For this purpose, the controller 1m-50 may include at least one processor. The controller may be electrically connected to the transceiver.

Embodiment B

The disclosure proposes a bearer management and data processing method of wireless nodes in a next generation mobile communication system supporting wireless backhaul and a method for recovering lost data caused by radio link breakage or congestion at the wireless nodes.

In detail, the disclosure proposes a PDCP status report-based lost data retransmission method and procedure between PDCP entities of two wireless end nodes in a wireless backhaul network.

Detailed descriptions of the proposed methods are made hereinafter in various disclosed embodiments hereinafter.

Figure 2A:
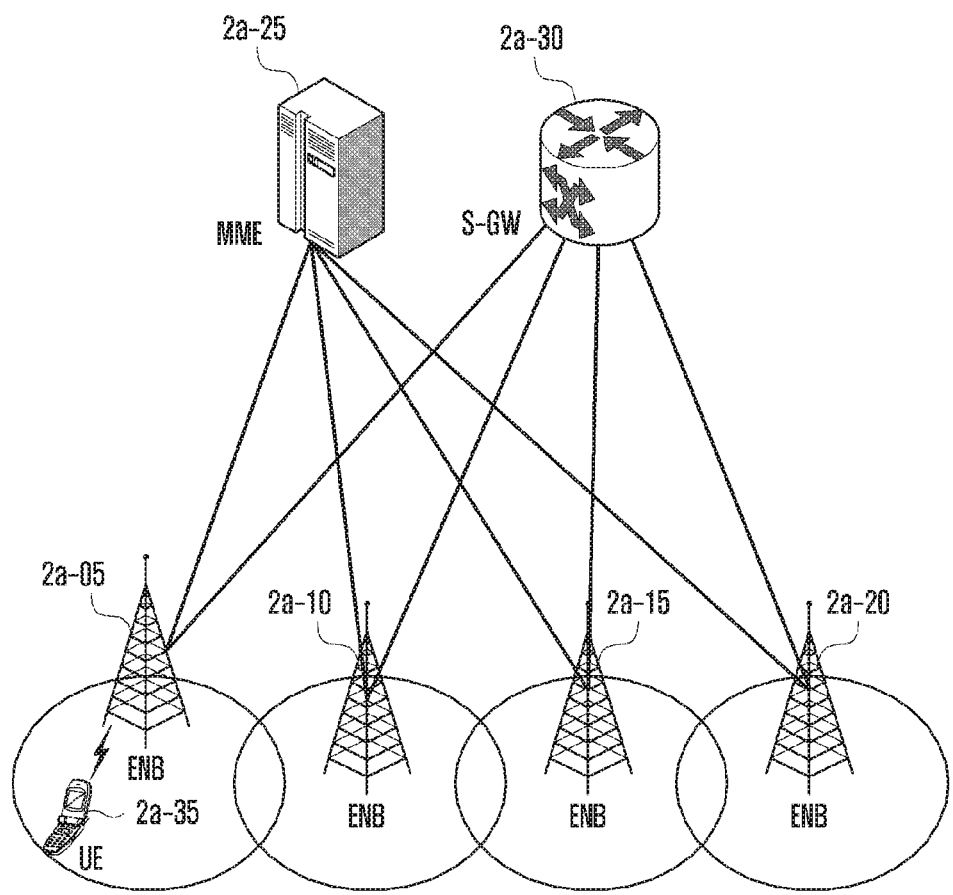
FIG. 2A illustrates a diagram of architecture of an LTE system to which the disclosure is applied.

FIG. 2A illustrates a diagram of architecture of an LTE system to which the disclosure is applied.

In reference to FIG. 2A, a radio access network of the LTE system includes evolved Node Bs (hereinafter, interchangeably referred to as eNB, node B, and base station) 2a-05, 2a-10, 2a-15, and 2a-20; a mobility management entity (MME) 2a-25; and a serving gateway (S-GW) 2a-30. A user terminal (hereinafter, interchangeably referred to as user equipment (UE) and terminal) 2a-35 connects to an external network via the eNBs 2a-05, 2a-10, 2a-15, and 2a-20 and the S-GW 2a-30.

The eNBs 2a-05, 2a-10, 2a-15, and 2a-20 correspond to the legacy node Bs of the universal mobile telecommunications system (UMTS). The UE 2a-35 connects to one of the eNBs via a radio channel, and the eNB has more complex functions than the legacy node B. In the LTE system where all user traffic including real time services such as Voice over IP (VoIP) is served through shared channels, there is a need of an entity for collecting UE-specific status information (such as buffer status, power headroom status, and channel status) and scheduling the UEs based on the collected information, and the eNB takes charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 2a-30 handles data bearer functions to establish and release data bearer under the control of the MME 2a-25. The MME 2a-25 handles various control functions for the UE as well as the mobile management function and has connections with the eNBs 2a-05, 2a-10, 2a-15, and 2a-20.

Figure 2B:
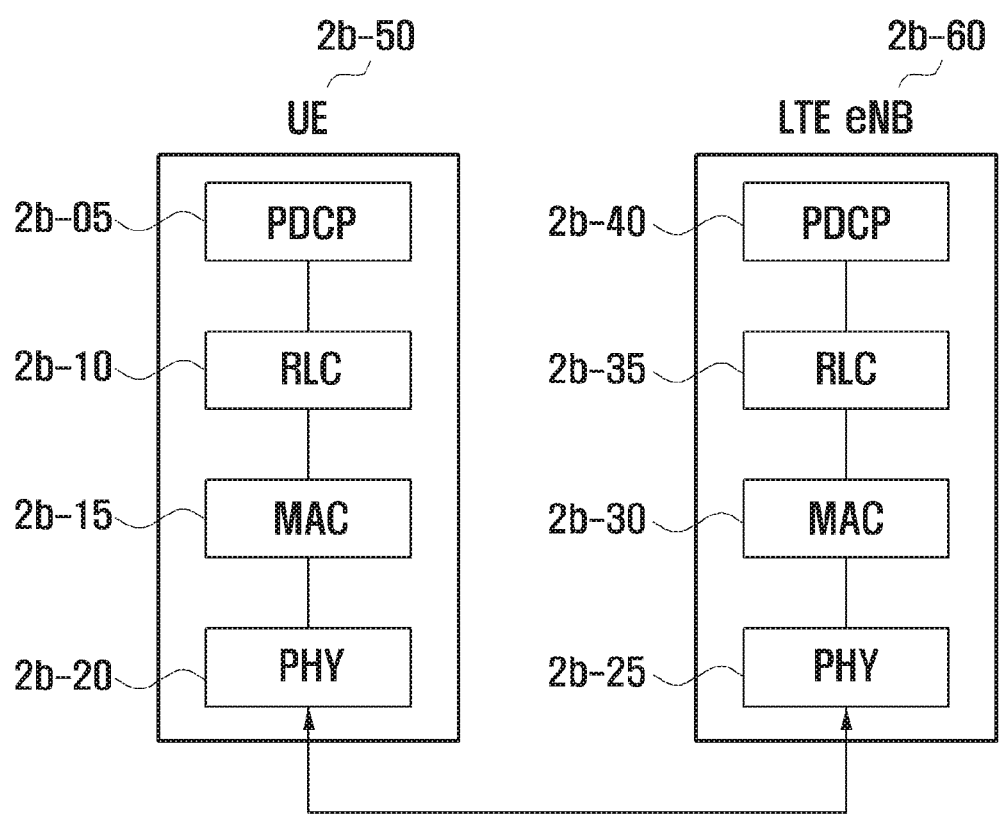
FIG. 2B illustrates a diagram of a protocol stack of an LTE system to which the disclosure is applied.

FIG. 2B illustrates a diagram of a protocol stack of an LTE system to which the disclosure is applied.

As shown in FIG. 2B, the protocol stack of the interface between the UE 2b-50 and the eNB 2b-60 in the LTE system includes Packet Data Convergence Protocol (PDCP) 2b-05 and 2b-40, Radio Link Control (RLC) 2b-10 and 2b-35, and Medium Access Control (MAC) 2b-15 and 2b-30. The PDCP 2b-05 and 2b-40 takes charge of compressing/decompressing an IP header. The main functions of the PDCP 2b-05 and 2b-40 can be summarized as follows:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC 2b-10 and 2b-35 takes charge of reformatting PDCP PDUs in order to fit them into the size for ARQ operation. The main functions of the RLC layer can be summarized as follows:

Transfer of upper layer PDUs)
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment The MAC 2b-15 and 2b-30 allows for connection of multiple RLC entities established for one UE and takes charge of multiplexing RLC PDUs from the RLC layer into a MAC PDU and demultiplexing a MAC PDU into RLC PDUs. The main functions of the MAC layer can be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The PHY layer 2b-20 and 2b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 2C:
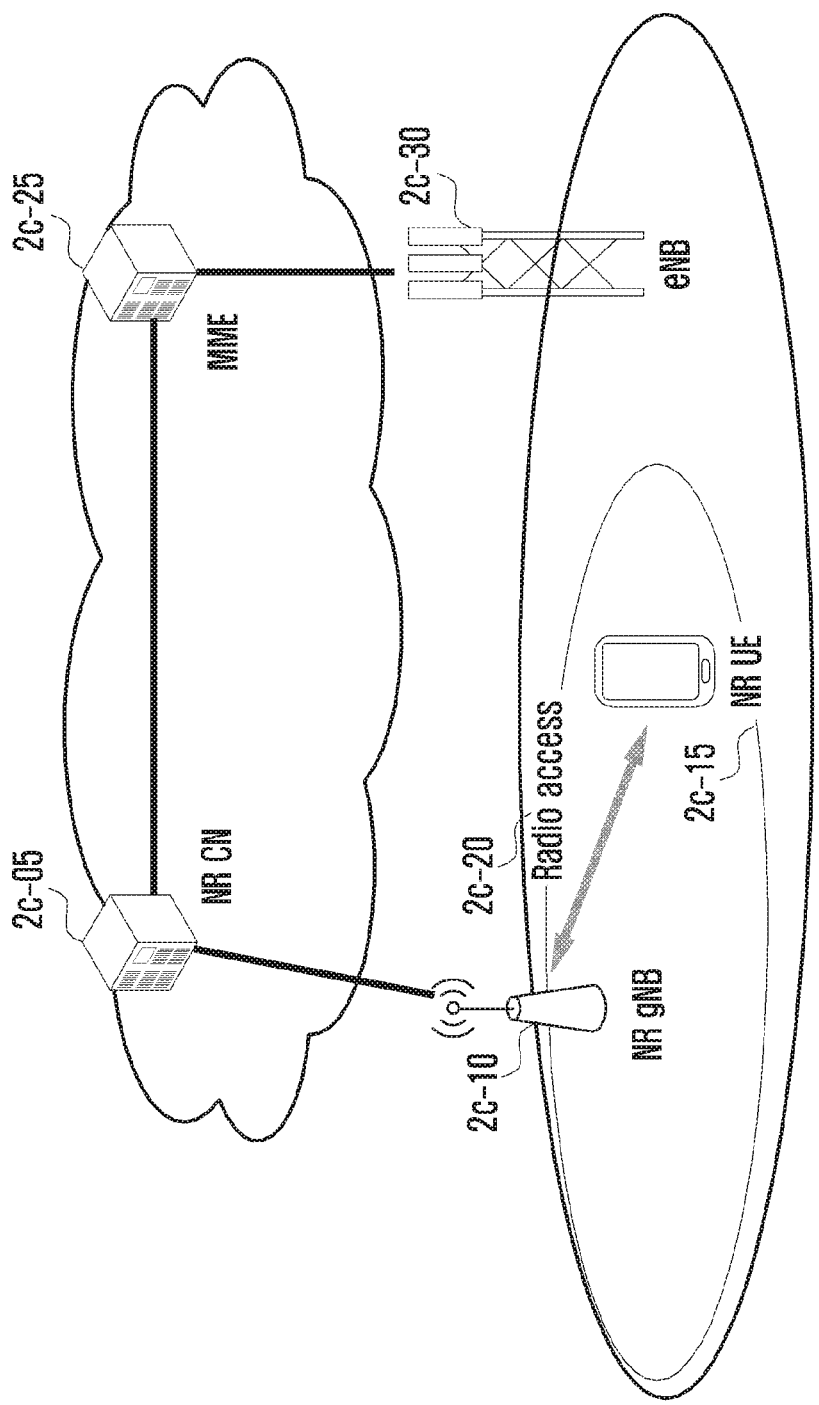
FIG. 2C illustrates a diagram of architecture of a next generation mobile communication system to which the disclosure is applied.

FIG. 2C illustrates a diagram of architecture of a next generation mobile communication system to which the disclosure is applied.

As shown in FIG. 2C, the next generation mobile communication system includes a radio access network with a next generation base station (New Radio Node B (NR gNB)) 2c-10 and a new radio core network (NR CN) 2c-05. A new radio user equipment (NR UE) 2c-15 connects to an external network via the NR gNB 2c-10 and the NR CN 2c-05.

In FIG. 2C, the NR gNB 2c-10 corresponds to an evolved Node B (eNB) of the legacy LTE. The NR gNB 2c-10 to which the NR UE 2c-15 connects through a radio channel is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 2c-10 takes charge of this function. Typically, one NR gNB hosts multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 2c-05 takes charge of mobility support, bearer setup, and QoS configuration. The NR CN 2c-05 may take charge of a NR UE mobility management function, and a plurality of NR gNBs may connect to the NR CN 2c-05. The next generation mobile communication system may also interoperate with a legacy LTE system and, in this case, the NR CN 2c-05 connects to an MME 2c-25 through a network interface. The MME 2c-25 communicates with the eNB 2c-40 as a legacy base station.

Figure 2D:
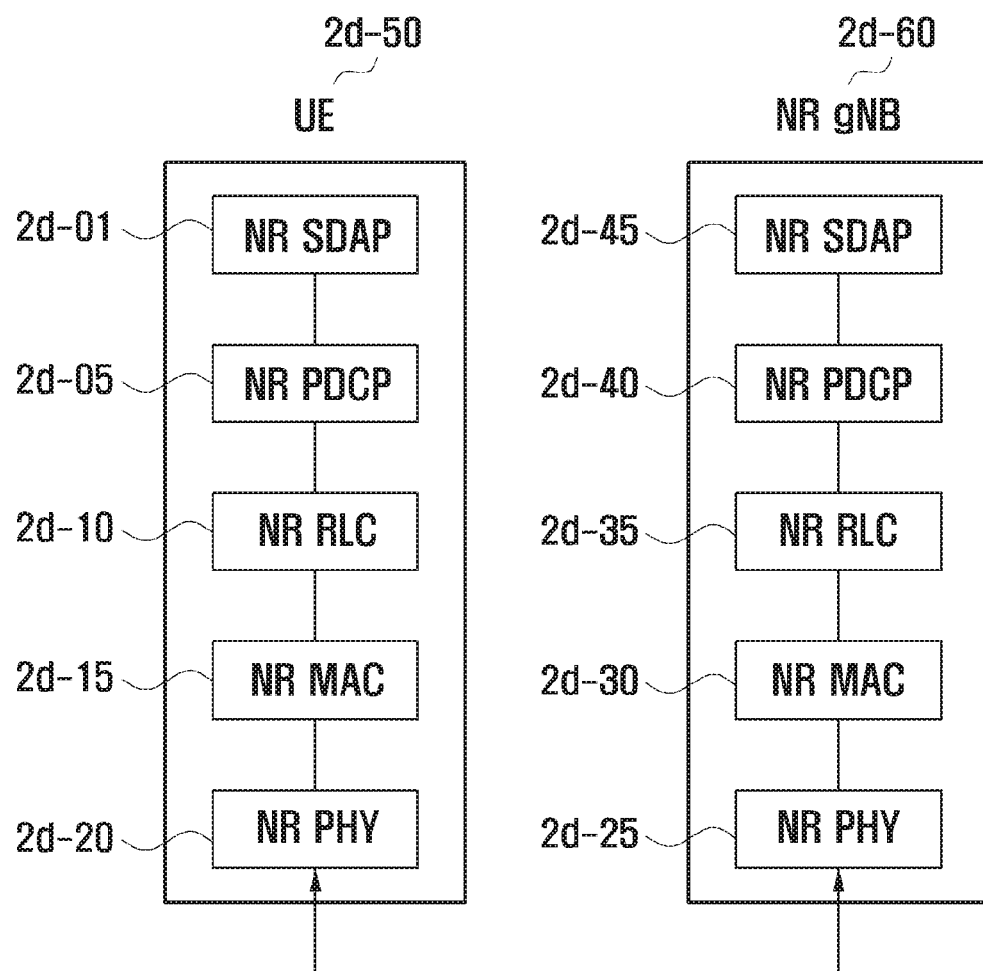
FIG. 2D illustrates a diagram of a protocol stack of a next generation mobile communication system to which the disclosure is applied.

FIG. 2D illustrates a diagram of a protocol stack of a next generation mobile communication system to which the disclosure is applied.

As shown in FIG. 2D, the protocol stack of the interface between an NR UE 2d-50 and an NR gNB 2d-60 in a next generation mobile communication system includes NR service data adaptation protocol (NR SDAP) 2d-01 and 2d-45, NR PDCP 2d-05 and 2d-40, NR RLC 2d-10 and 2d-35, and NR MAC 2d-15 and 2d-30.

The main functions of the NR SDAP 2d-01 and 2d-45 may include some of the following functions:
  transfer of user plane data
  mapping between a QoS flow and a DRB for both DL and UL
  marking QoS flow ID in both DL and UL packets)
  reflective QoS flow to DRB mapping for the UL SDAP PDUs The UE 2d-50 may receive an RRC message for configuring an SDAP entity 2d-01 so as to determine whether to use PDCP entity-specific, bearer-specific, or logical channel-specific SDAP header and whether to use SDAP layer function via an RRC message and, if configured to use a specific PDAP header, receive a 1-bit NAS reflective QoS indicator and an AS reflective QoS indicator in the SDAP header indicative of instructing the UE 2d-50 to update or reconfigure uplink and downlink QoS flow-data bearer mappings. The SDAP header may include QoS flow ID indicating a QoS. The QoS information may be used as data processing priority and scheduling information for guaranteeing service reliability.

The main functions of the NR PDCP 2d-05 and 2d-40 may include some of the following functions:
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The PDCP PDU reordering function of an NR PDCP entity 2d-05 and 2d-40 is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC 2d-10 and 2d-35 may include some of the following functions.
  Transfer of upper layer PDUs)
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of an NR RLC entity 2d-10 and 2d-35 is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer 2*d*-10 and 2*d*-35 may have no concatenation function and, in this case, the concatenation function may be performed in the NR MAC layer 2*d*-15 and 2*d*-30 or replaced by the multiplexing function of the NR MAC layer 2*d*-15 and 2*d*-30.

The out-of-sequence delivery function of an NR RLC entity 2*d*-10 and 2*d*-35 is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

The NR MAC 2*d*-15 and 2*d*-30 may be connected to multiple NR RLC entities, and the main functions of the NR MAC 2*d*-15 and 2*d*-30 may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 2*d*-20 and 2*d*-25 takes charge of channel-coding and modulation on upper layer data to generate and transmit OFDM symbols over a radio channel and demodulating and channel-decoding on OFDM symbols received over the radio channel to deliver the decoded data to the upper layers.

Figure 2E:
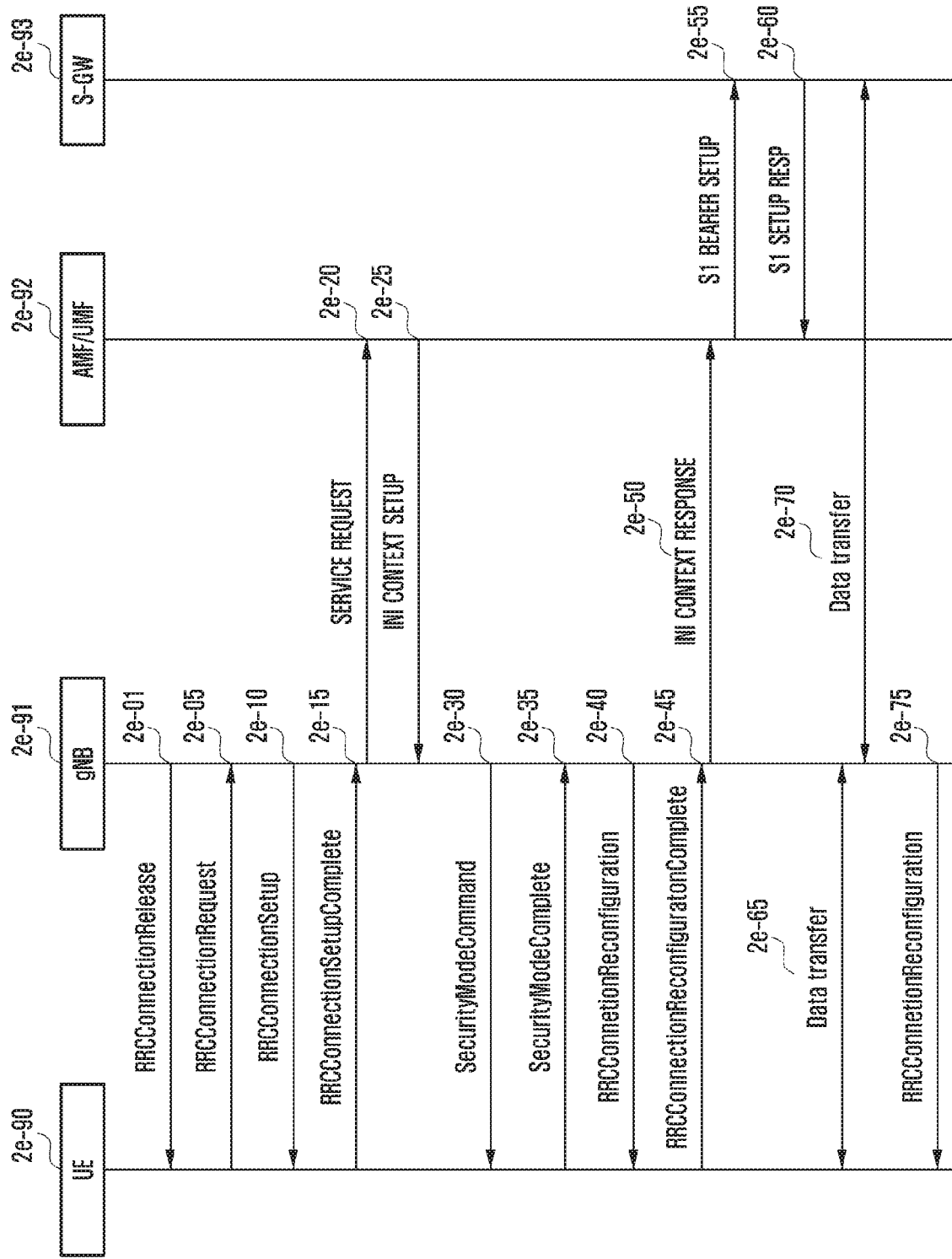
FIG. 2E illustrates a signal flow diagram of a procedure for transitioning a UE from an RRC connected mode to an RRC idle mode based on connection release triggered by a base station and transitioning the UE from the RRC idle mode to the RRC connected mode based on connection establishment triggered by the UE according to an embodiment of the disclosure.

FIG. 2E illustrates a signal flow diagram of a procedure for transitioning a UE from an RRC connected mode to an RRC idle mode based on connection release triggered by a base station and transitioning the UE from the RRC idle mode to the RRC connected mode based on connection establishment triggered by the UE according to an embodiment of the disclosure.

In reference to FIG. 2E, if there is no data transmission/reception to/from the UE 2*e*-90 in the RRC connected mode for any reason or during a predetermined period, the base station 2*e*-91 may transmit an RRCConnectionRelease message to the UE 2*e*-90 at step 2*e*-01 to transition the UE 2*e*-90 to an RRC idle mode. If data to be transmitted are produced at the UE 2*e*-90 with no currently established connection (hereinafter, referred to as idle mode UE), the UE 2*e*-90 performs an RRC connection establishment procedure with the base station 2*e*-91.

The UE 2*e*-90 acquires uplink transmission synchronization with the base station 2*e*-91 through a random access procedure and transmits an RRCConnectionRequest message to the base station 2*e*-91 at step 2*e*-05. The RRCConnectionRequest message may include an identifier of the UE 2*e*-90 and a connection establishment cause (establishmentCause).

The base station 2*e*-91 transmits an RRCConnectionSetup message to the 2*e*-90 at step 2*e*-10 for RRC connection setup.

The RRCConnectionSetup message includes RRC connection configuration information. The RRCConnectionSetup message may also include a UE identifier for use in identifying the UE 2*e*-90 connected to the base station 2*e*-91. The RRCConnectionSetup message may also include a list of identifiers of other UEs that are currently connected to the base station 2*e*-91. The list of the identifiers of other UEs that are currently connected to the base station 2*e*-91 may be periodically updated based on the system information broadcast by the base station 2*e*-91 in order for the UEs located within coverage of the base station 2*e*-91 to identify other UEs available for communication. When a wireless device are installed in a factory, the identifiers of other wireless devices available for communication may preset. The UE identifier may be a cell radio network temporary identifier (C-RNTI), part of the C-RNTI, or part of a NAS layer identifier (e.g., globally unique temporary identifier (GUTI)).

An RRC connection may be referred to as signaling radio bearer and used for communicating RRC messages as control messages between the UE 23-90 and the base station 2*e*-91. After establishing the RRC connection, the UE 2*e*-90 transmits an RRCConnectionSetupComplete message to the base station 2*e*-91 at step 2*e*-15. The RRCConnectionSetupComplete message includes a control message called SERVICE REQUEST for requesting to an MME 2*e*-92 for establishing a bearer for a certain service. At step 2*e*-20, the base station 2*e*-91 transmits the SERVICE REQUEST message included in the RRCConnectionSetupComplete message to the MME 2*e*-92, and the MME 2*e*-92 determines whether provide the service requested by the UE 2*e*-90.

If it is determined to provide the service requested by the UE 2*e*-90, the MME 2*e*-92 transmit an INITIAL CONTEXT SETUP REQUEST message to the base station 2*e*-91 at step 2*e*-25. The this message includes quality of service (QoS) information to be applied in configuring a DRB and security information (e.g., Security Key and Security Algorithm) to be applied to the DRB.

For security configuration, the base station 2*e*-91 transmits a SecurityModeCommand message to the UE 2*e*-90 at step 2*e*-30, and the UE 2*e*-90 transmits a SecurityModeComplete message to the base station 2*e*-91 at step 2*e*-35. After completing security configuration, the base station 2*e*-91 transmits an RRCConnectionReconfiguration message to the UE 2*e*-90 at step 2*e*-40.

The RRCConnectionReconfiguration message may include UE identifier for use in identifying the UE 2*e*-90 within coverage of the base station 2*e*-91. This message may also include a list of identifiers of other UEs that are currently connected to the base station 2*e*-91. The list of the identifiers of other UEs that are currently connected to the base station 2*e*-91 may be periodically updated based on the system information broadcast by the base station 2*e*-91 in order for the UEs located within coverage of the base station 2*e*-91 to identify other UEs available for communication. When a wireless device are installed in a factory, the identifiers of other wireless devices available for communication may preset. The UE identifier may be a cell radio network temporary identifier (C-RNTI), part of the C-RNTI, or part of a NAS layer identifier (e.g., globally unique temporary identifier (GUTI)).

The RRCConnectionReconfiguration message include DRB configuration information for processing user data, and the UE 2*e*-90 configures a DRB based on this configuration information and transmits an RRCConnectionReconfigurationComplete message to the base station 2*e*-91 at step 2*e*-45. After completing DRB configuration with the UE 2*e*-90, the base station 2*e*-91 transmits an INITIAL CONTEXT SETUP COMPLETE message to the MME 2*e*-92 at step 2*e*-50; upon receipt of the INITIAL CONTEXT SETUP COMPLETE message, the MME 2*e*-92 configures a S1 bearer with an S-GW 2*e*-93 by transmitting an S1 BEARER SETUP message to the S-GW 2*e*-93 at step 2*e*-55 and receiving an S1 BEARER SETUP RESPONSE message from the S-GW 2e-93 at step 2e-60. The S1 bearer is a connection for data transfer between the S-GW 2e-93 and the base station 2e-91 and mapped to the DRB 1 one to one. After completing the above procedure, the UE 2e-90 performs data communication via base station 2e-91 and S-GW 2e-93 at steps 2e-65 and 2e-70. This typical data communication procedure consists of three phases: RRC connection configuration, security configuration, and DRB configuration. The base station 2e-91 may transmit an RRCConnectionReconfiguration message to the UE 2e-90 at step 2e-75 for updating, adding, or modifying the configuration.

Hereinafter, a description is made of the low latency data communication procedure between wireless devices.

Figure 2F:
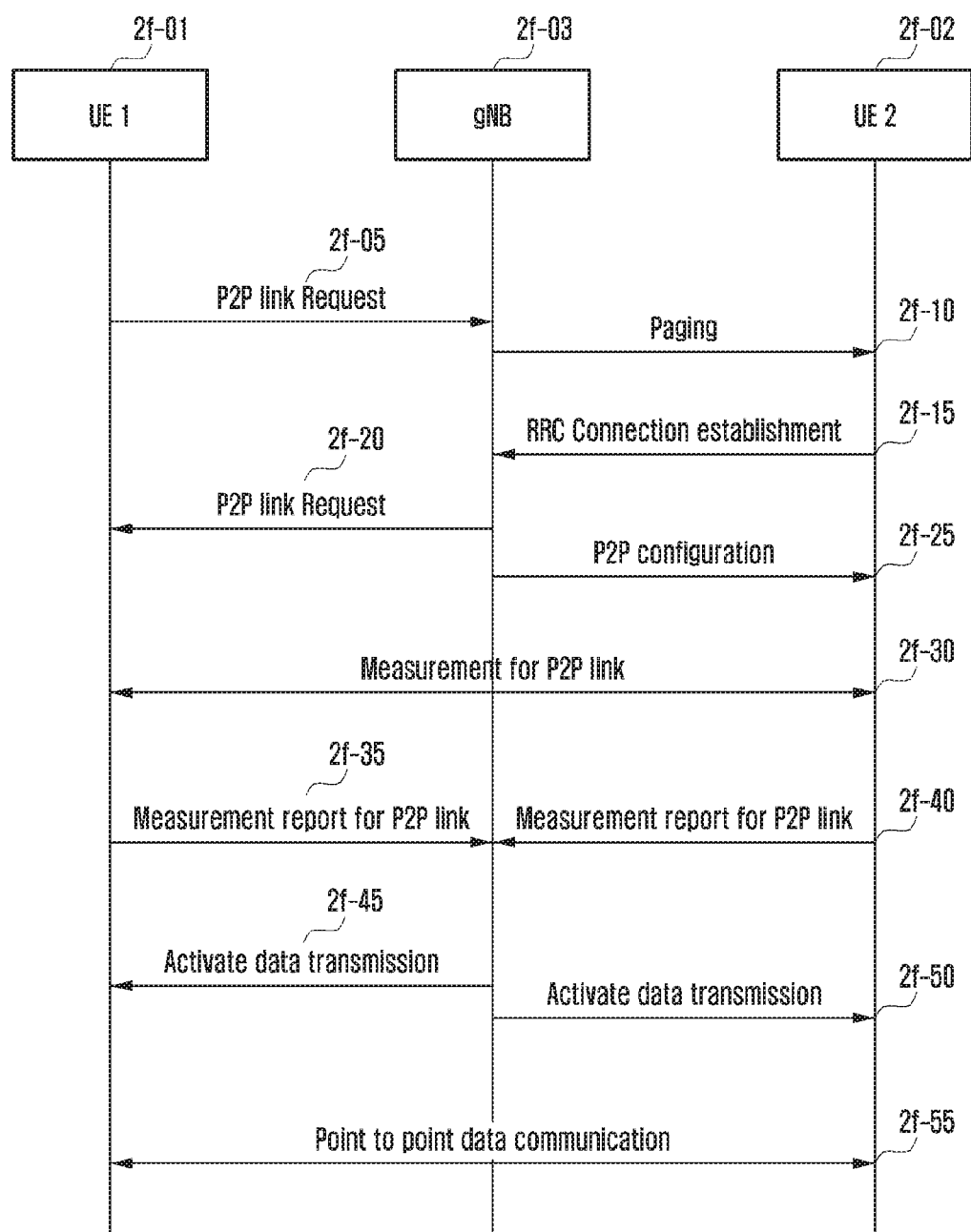
FIG. 2F illustrates a signal flow diagram of a procedure for establishing a point-to-point link between wireless devices for data communication according to an embodiment of the disclosure.

FIG. 2F illustrates a signal flow diagram of a procedure for establishing a point-to-point link between wireless devices for data communication according to an embodiment of the disclosure. The one-to-one link denotes a link established for direct data communication between the wireless devices without intervention of the base station.

The proposed procedure of configuring a point-to-point communication link between wireless devices may be divided into four steps: wireless device discovery, inter-device point-to-point wireless link or direct link assessment and measurement, inter-device direct wireless link establishment, and data communication through the inter-device direct link; the procedure is characterized by one or more of the following:

1. A gNB 2f-03 may share and manage UE identifiers of wireless devices within its coverage for supporting wireless data communication.

2. The gNB 2f-03 may configure the wireless devices within its coverage for supporting wireless data communication to always remain in an RRC connected mode or an RRC deactivated mode.

3. A wireless device transmits a transmission resource request message including an identifier of a destination device or a source device to the gNB 2f-03 to request for allocation of transmission resources for point-to-point communication.

4. The gNB 2f-03, upon being requested by the wireless device to allocate transmission resources for point-to-point communication, performs a procedure for discovering the destination wireless device (e.g., transmitting paging message) using the identifier of the destination wireless device. If the gNB 2f-03 fails to discover the destination wireless device or if the destination wireless device is not located within the coverage of the gNB 2f-03, the gNB 2f-03 allocates uplink transmission resources to the source wireless device and relays data between the source and destination wireless devices.

5. The gNB 2f-03 may allocate part of normal uplink transmission resources of the UE as transmission resources for point-to-point communication.

6. The gNB 2f-03, when allocating transmission resources for point-to-point communication to wireless devices, may inform the wireless devices of a source wireless device identifier or a destination wireless device identifier, send frequency configuration information for point-to-point wireless link to the wireless devices, and instruct the wireless devices to perform frequency measurement or transmit a reference signal.

7. The wireless devices allocated the transmission resources for point-to-point communication performs frequency measurement on point-to-point wireless links for point-to-point communication and report frequency measurement results to the gNB 2f-30.

8. The gNB 2f-03 may receive the frequency measurement results from the source and destination wireless devices and instruct the source wireless device to perform data transmission based on the frequency measurement results using a newly defined L1 signal (e.g., DCI) or L2 signal (e.g., MAC CE) and the destination wireless device to perform data transmission based on the frequency measurement results using the newly defined L1 signal (e.g., DCI) or L2 signal (e.g., MAC CE).

9. The wireless device that is instructed to perform data transmission through the newly defined L1 signal (e.g., DCI) or L2 signal (e.g., MAC CE) starts data transmission.

The proposed procedure for establishing a point-to-point wireless link between wireless devices is described in more detail hereinafter.

The gNB 2f-03 may share and manage UE identifiers of wireless devices within its coverage for supporting wireless data communication. The gNB 2f-03 may configure the wireless devices 2f-01 or 2f-03 within its coverage for supporting wireless data communication to always remain in an RRC connected mode or an RRC deactivated mode to maintain low transmission latency.

At step 2f-05, the wireless device 2f-01 may transmit a transmission resource request message including an identifier of a destination device 2f-02 or the source device 2f-01 to the gNB 2f-03 to request for allocation of transmission resources for point-to-point communication. The point-to-point transmission resource request message may include QoS requirements. For example, the resource request message being transmitted from the wireless device 2f-01 to the 2f-03 may include an average packet size, a transmission bit rate, a transmission delay requirement, a reliability, and an error rate.

Upon being requested by the (source) wireless device 2f-01 to allocate transmission resources, the 2f-03 may perform, at step 2f-10, a procedure for discovering the destination wireless device 2f-02 (e.g., transmitting paging message) using the identifier of the destination wireless device 2f-02. If the gNB 2f-03 fails to discover the destination wireless device 2f-02 or if the destination wireless device 2f-02 is not located within the coverage of the gNB 2f-03, the gNB 2f-03 allocates uplink transmission resources to the source wireless device 2f-01 and relays data in such a way of receiving the data from the source wireless device 2f-01 and transmit the data to a network. The paging message may include the identifier of the source wireless device 2f-01 or the destination wireless device 2f-02.

If the destination wireless device 2f-02 receives the paging message, it establishes a connection with the gNB 2f-03 at step 2f-15. Then, the gNB 2f-03 may transmit a point-to-point response message to the source wireless device 2f-01 at step 2f-20, in response to the request for allocation of transmission resources for point-to-point communication, and a point-to-point configuration message to the destination wireless device 2f-02 at step 2f-25. The gNB 2f-03 may allocate part of normal uplink transmission resources of the UE as transmission resources for point-to-point communication. The allocated transmission resources may be transmission resources being allocated repetitively at a predetermined interval. In this case, once the transmission resources are configured, the wireless devices 2f-01 and 2f-02 may perform point-to-point communication continuously with the transmission resources without intervention of the gNB 2f-03. Such transmission resources may be allocated via system information broadcasted by the gNB 2f-03 rather than a dedicated signaling, and the gNB 2f-03 may inform the wireless device 2f-01 and 2f-02 of the resources for use in point-to-point communication among the transmission resources indicated in the system information. If the wireless device 2f-01 and 2f-02 is allocated transmission resources by the gNB 2f-03 via both the system information and dedicated signaling, it may prioritize the transmission resources allocated by the gNB 2f-03 via the dedicated signaling. When allocating transmission resources for point-to-point communication to wireless devices, the gNB 2f-03 may inform the wireless devices 2f-01 and 2f-02 of the identifiers of the source and destination wireless devices 2f-01 and 2f-02, send frequency configuration information for point-to-point wireless link to the wireless devices, and instruct the wireless devices to perform frequency measurement or transmit a reference signal.

The transmission resources for point-to-point communication may include time resources, frequency resources, code resources, the identifier of the source wireless device 2f-01 or the identifier of the destination wireless device 2f-02, modulation or demodulation coding information (MCS), a transport block (TB) size, an identifier for activating the wireless information (e.g., RNTI).

The source and destination wireless devices 2f-01 and 2f-02 that have been allocated the transmission resources for point-to-point communication may transmit a reference signal on the transmission resources, perform frequency measurement on the point-to-point wireless link, at step 2f-30, for point-to-point communication, and report frequency measurement results to the gNB 2f-03 at steps 2f-35 and 2f-40.

Upon receipt of the frequency measurement results from the source and destination wireless devices 2f-01 and 2f-02, the gNB 2f-03 may instruct, at step 2f-45, the source wireless device 2f-01 to perform data transmission based on the frequency measurement results using a newly defined L1 signal (e.g., DCI) or L2 signal (e.g., MAC CE) and, at step 2f-50, the destination wireless device 2f-02 to perform data transmission based on the frequency measurement results using the newly defined L1 signal (e.g., DCI) or L2 signal (e.g., MAC CE).

Upon being instructed by the gNB 2f-03, via the newly defined L1 signal (e.g., DCI) or L2 signal (e.g., MAC CE), to perform data transmission, the source wireless device 2f-01 or the destination wireless device 2f-02 may perform data transmission, at step 2f-55, on the transmission resources allocated for point-to-point communication.

In the above procedure, the source and destination wireless devices 2f-01 and 2f-02 may perform reliability measurement on the data being transmitted/received or frequency measurement on the reference signal on the direct wireless link periodically to request to the gNB 2f-03, if the measurement result is equal to or less than a level predetermined or preconfigured for the configured point-to-point link, for update of the point-to-point link or a new point-to-point link as at step 2f-05. When perform reliability measurement on the data being transmitted/received, the source and destination wireless devices 2f-01 and 2f-02 may check sequence numbers of the data to identify a number, size, or amount of lost data to assess the quality of the direct wireless link.

When requesting to the gNB 2f-03 for update of the point-to-point wireless link, the source wireless device 2f-01 or the destination wireless device 2f-02 may report the reliability, transmission latency, or error assessed or experienced on the currently configured direct wireless link.

Figure 2G:
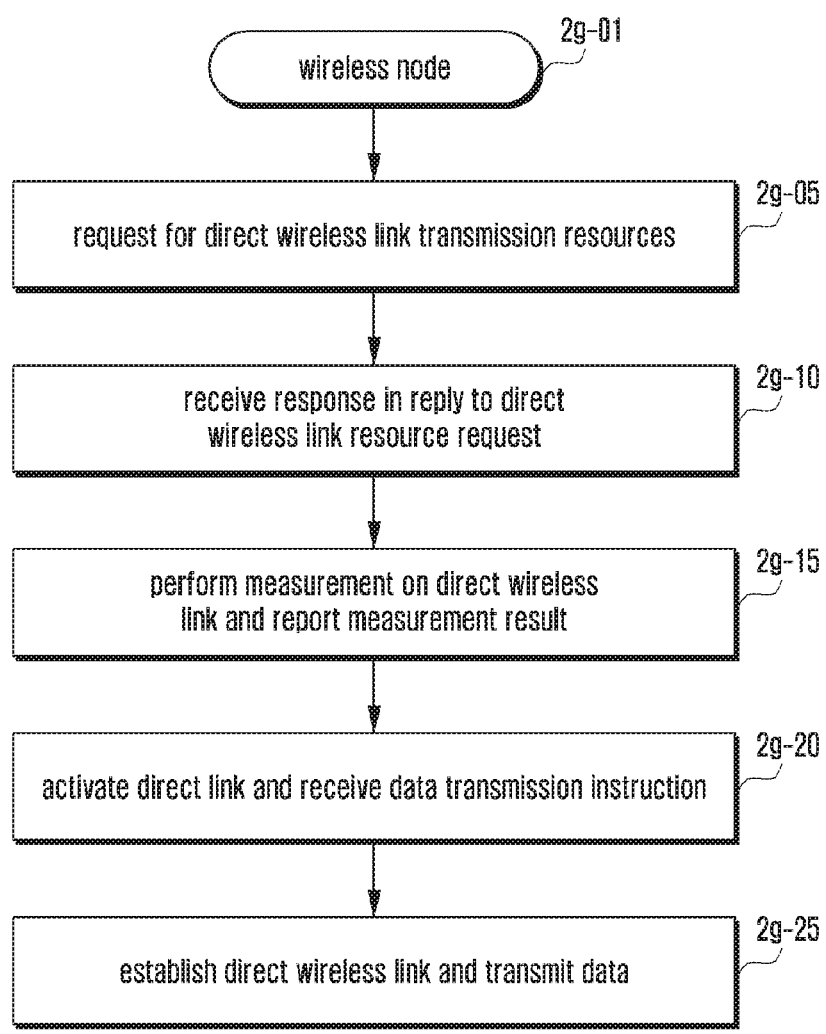
FIG. 2G illustrates a flowchart of an operation of a wireless device for configuring a point-to-point direct wireless link according to an embodiment of the disclosure.

FIG. 2G illustrates a flowchart of an operation of a wireless device for configuring a point-to-point direct wireless link according to an embodiment of the disclosure.

At step 2g-05, the source wireless device may transmit a direct wireless link resource request message including an identifier of a destination wireless device or an identifier of the source wireless device to a base station to request for allocation of transmission resources for point-to-point communication. Upon being requested by the source wireless device to allocate transmission resources for point-to-point communication, the base station may perform a procedure for discovering the destination wireless device (e.g., transmitting a paging message) with the identifier of the destination wireless device. If the destination wireless device receives the paging message, it establishes a connection with the base station. Then the base station may transmit a response message indicating the transmission resources for point-to-point communication to the source wireless device in reply to the direct wireless link resource request message and a point-to-point configuration message to the destination wireless device to allocate transmission resources; the wireless devices receive the response message at step 2g-10. When allocating the transmission resources for point-to-point communication to the wireless devices, the base station may notify the wireless devices of the identifier of the source or destination wireless device, configure a frequency of the point-to-point link to the wireless devices, instruct the wireless devices to perform frequency measurement, and/or configure and instruct the wireless devices to transmit reference signals.

After being allocated the transmission resources for point-to-pit communication, the source and destination wireless devices may transmit reference signals on the transmission resources, perform frequency measurement on a point-to-point link for point-to-point communication, and report frequency measurement results to the base station at step 2g-15.

Upon receipt of the frequency measurement results from the source and destination wireless devices, the base station may instruct the source wireless device to perform data transmission based on the frequency measurement results using a newly defined L1 signal (e.g., DCI with an identifier) or L2 signal (e.g., MAC CE) and the destination wireless device to perform data transmission based on the frequency measurement results using the newly defined L1 signal (e.g., DCI) or L2 signal (e.g., MAC CE); the wireless devices activate a direct link and receive the data transmission instruction at step 2g-20.

Upon receipt of the instruction for instructing to perform data transmission through the newly defined L1 signal (e.g., DCI with an identifier) or L2 signal (e.g., MAC CE), the source or destination wireless device may perform data transmission on the transmission resources at step 2g-25.

Figure 2H:
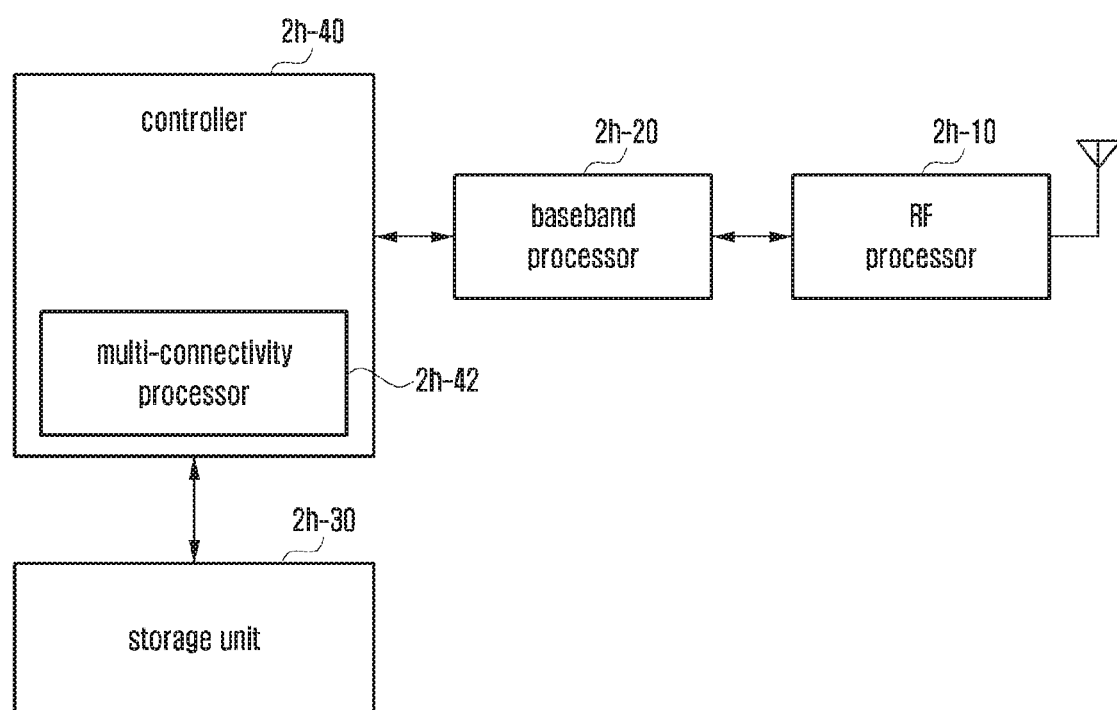
FIG. 2H illustrates a diagram of a configuration of a UE or a wireless node according to an embodiment of the disclosure.
Figure 21:
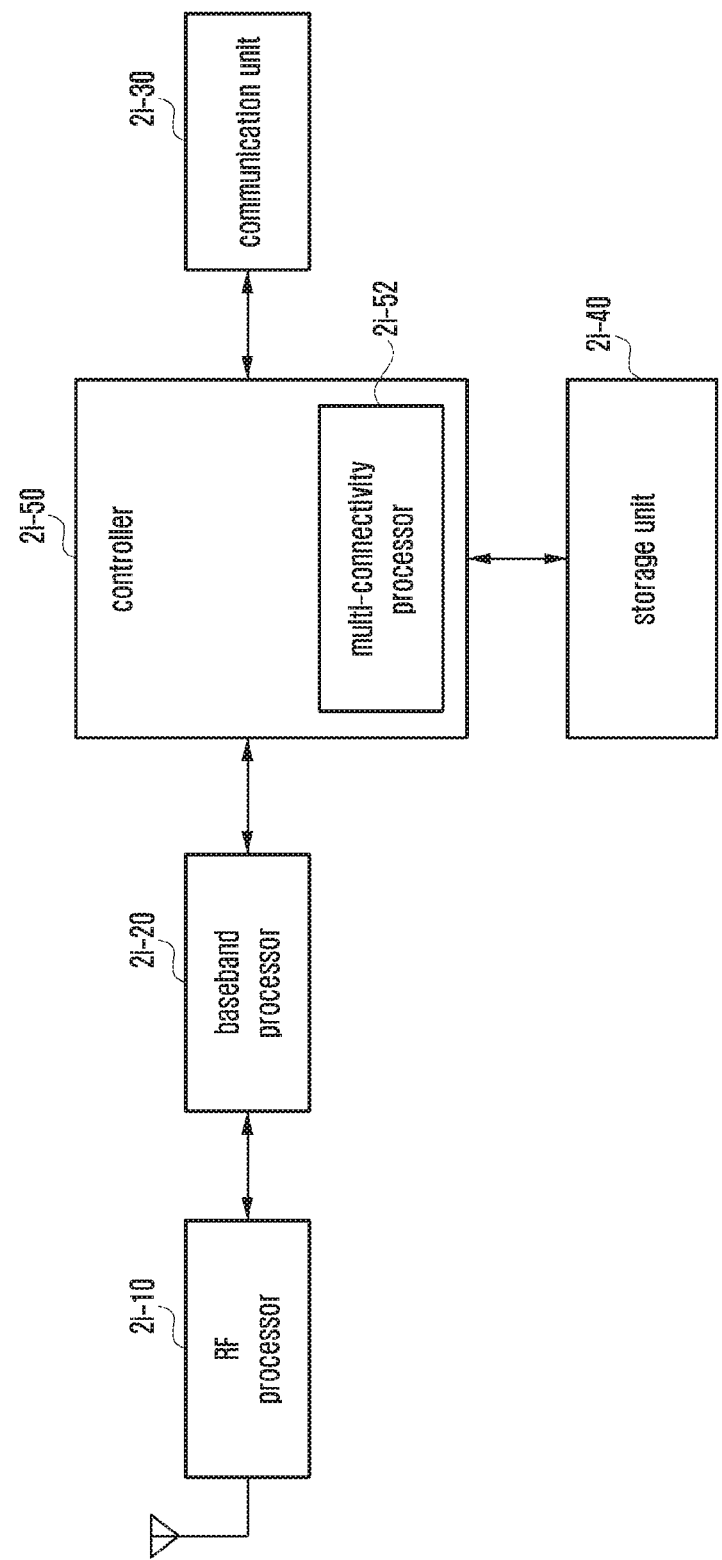

FIG. 2H illustrates a diagram of a configuration of a UE or a wireless node according to an embodiment of the disclosure.

In reference to FIG. 2H, the UE includes a radio frequency (RF) processor 2h-10, a baseband processor 2h-20, a storage unit 2h-30, and a controller 2h-40.

The RF processor 2h-10 has a function for transmitting/receiving a signal over a radio channel such as band conversion and amplification of the signal. That is, the RF processing unit 2h-10 up-converts a baseband signal from the baseband processor 2h-20 to an RF band signal and transmits the RF signal via an antenna and down-converts the RF signal received via the antenna to a baseband signal. For example, the RF processor 2h-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 2h-10 may also include a plurality of RF chains. The RF processor 2h-10 may perform beamforming. For beamforming, the RF processor 2h-10 may adjust the phase and size of a signal to be transmitted/received by means of the antennas or antenna elements. The RF processor 2h-10 may be configured to support a MIMO scheme with which the UE can receive multiple layers simultaneously. The RF processor 2h-10 may configure the plurality of antennas or antenna elements appropriately, under the control of the controller 2h-40, to perform beam sweeping and adjust the beam direction and beam width to achieve an alignment of the reception and transmission beam.

The baseband processor 2h-20 has a baseband signal-bit string conversion function according to a physical layer standard of the system. For example, in a data transmission mode, the baseband processor 2h-20 performs encoding and modulation on the transmission bit string to generate complex symbols. In a data reception mode, the baseband processor 2h-20 performs demodulation and decoding on the baseband signal from the RF processor 2h-10 to recover the transmitted bit string. In the case of using an OFDM scheme for data transmission, the baseband processor 2h-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 2h-20 splits the baseband signal from the RF processor 2h-10 into OFDM symbols, perform fast Fourier transform (FFT) on the OFDM symbols to recover the signals mapped to the subcarriers, and performs demodulation and decoding on the signals to recover the transmitted bit string.

The baseband processor 2h-20 and the RF processor 2h-10 process the transmission and reception signals as described above. Accordingly, the baseband processor 2h-20 and the RF processor 2h-10 may be referred to as a transmitter, a receiver, a transceiver, or a communication unit/ circuit. At least one of the baseband processor 2h-20 and the RF processor 2h-10 may include a plurality of communication modules for supporting different radio access technologies. At least one of the baseband processor 2h-20 and the RF processor 2h-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.2 GHz and 2 GHz bands) and an mmWave band (e.g., 60 GHz).

The storage unit 2h-30 stores data such as basic programs for operation of the UE, application programs, and setting information. The storage unit 2h-30 provides the stored information in response to a request from the controller 2h-40.

The controller 2h-40 controls overall operations of the UE. For example, the controller 2h-40 controls the baseband processor 2h-20 and the RF processor 2h-10 for transmitting and receiving signals. The controller 2h-40 writes and reads data to and from the storage unit 2h-40. For this purpose, the controller 2h-40 may include at least one processor. For example, the controller 2h-40 may include a communication processor (CP) for controlling communications and an application processor (AP) for controlling higher layer programs such as applications. The controller 2h-40 may be electrically connected to the transceiver.

FIG. 2I illustrates a block diagram of a configuration of a base station or a wireless node in a wireless communication system according to an embodiment of the disclosure.

In reference to FIG. 2I, the base station includes an RF processor 2i-10, a baseband processor 2i-20, a backhaul communication unit 2i-30, a storage unit 2i-40, and a controller 2i-50.

The RF processor 2i-10 has a function for transmitting/ receiving a signal over a radio channel such as band conversion and amplification of the signal. That is, the RF processing unit 2i-10 up-converts a baseband signal from the baseband processor 2i-20 to an RF band signal and transmits the RF signal via an antenna and down-converts the RF signal received via the antenna to a baseband signal. For example, the RF processor 2i-10 may include a transmission filter, a reception filter, an amplifier, a mixer, an oscillator, a DAC, and an ADC. Although one antenna is depicted in the drawing, the base station may be provided with a plurality of antennas. The RF processor 2i-10 may also include a plurality of RF chains. The RF processor 1i-10 may perform beamforming. For beamforming, the RF processor 2i-10 may adjust the phase and size of a signal to be transmitted/ received by means of the antennas or antenna elements. The RF processor 2i-10 may be configured to transmit one or more layers for a downlink MIMO operation.

The baseband processor 2i-20 has a baseband signal-bit string conversion function according to a physical layer standard of the system. For example, in a data transmission mode, the baseband processor 2i-20 performs encoding and modulation on the transmission bit string to generate complex symbols. In a data reception mode, the baseband processor 2i-20 performs demodulation and decoding on the baseband signal from the RF processor 2i-10 to recover the transmitted bit string. In the case of using an OFDM scheme for data transmission, the baseband processor 2i-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 2i-20 splits the baseband signal from the RF processor 2i-10 into OFDM symbols, performs fast Fourier transform (FFT) on the OFDM symbols to recover the signals mapped to the subcarriers, and performs demodulation and decoding on the signals to recover the transmitted bit string. The baseband processor 2i-20 and the RF processor 2i-10 process the transmission and reception signals as described above. Accordingly, the baseband processor 2i-20 and the RF processor 2i-10 may be referred to as a transmitter, a receiver, a transceiver, or a communication unit.

The communication unit 2i-30 provides an interface for communication with other nodes in the network.

The storage unit 2i-40 stores data such as basic programs for operation of the base station, application programs, and setting information. The storage unit 2i-40 may also store the information on the bearers established for UEs and measurement results reported by the connected UEs. The storage unit 2i-40 may also store the information for use by a UE in determining whether to enable or disable multi-connectivity. The storage unit 2i-40 may provide the stored data in reference to a request from the controller 2i-50.

The controller 2i-50 controls overall operations of the base station. For example, the controller 2i-50 controls the baseband processor 2i-20, the RF processor 2i-10, and the backhaul communication unit 2*i*-30 for transmitting and receiving signals. The controller 2*i*-50 writes and reads data to and from the storage unit 2*i*-40. For this purpose, the controller 2*i*-50 may include at least one processor. The controller may be electrically connected to the transceiver.

Although the description has been made with reference to particular embodiments, the disclosure can be implemented with various modifications without departing from the scope of the disclosure. Thus, the disclosure is not limited to the particular embodiments disclosed but will include the following claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, a first message for checking one or more count values associated with one or more bearers, the first message including first information, the first information including a first identity of a first bearer, a first downlink count value associated with the first bearer and a first uplink count value associated with the first bearer; and
   transmitting, to the base station, a second message as a response to the first message,
   wherein in case that the first bearer is configured with a new radio (NR) packet data convergence protocol (PDCP) and in at least one case in which a most significant bits of a second downlink count value of the terminal associated with the first bearer is different from a most significant bits of the first downlink count value associated with the first bearer or a most significant bits of a second uplink count value of the terminal associated with the first bearer is different from a most significant bits of the first uplink count value associated with the first bearer, second information is included in the second message, the second information including the first identity of the first bearer, the second downlink count value of the terminal associated with the first bearer, and the second uplink count value of the terminal associated with the first bearer, the second downlink count value of the terminal associated with the first bearer being set to a value of TX_NEXT−1 and the second uplink count value of the terminal associated with the first bearer being set to a value of RX_NEXT−1,
   wherein in case that the first bearer is configured with a long term evolution (LTE) PDCP and in at least one case in which a most significant bits of a third downlink count value of the terminal associated with the first bearer is different from the most significant bits of the first downlink count value associated with the first bearer or a most significant bits of a third uplink count value of the terminal associated with the first bearer is different from the most significant bits of the first uplink count value associated with the first bearer, third information is included in the second message, the third information including the first identity of the first bearer, the third downlink count value of the terminal associated with the first bearer, and the third uplink count value of the terminal associated with the first bearer, and wherein the TX_NEXT is a count value of a next PDCP service data unit (SDU) to be transmitted and the RX_NEXT is a count value of a next PDCP SDU expected to be received.

2. The method of claim 1, wherein in case that a second identity of a second bearer established on the terminal is not included in the first message and the second bearer is configured with the NR PDCP, fourth information is included in the second message, the fourth information including the second identity of the second bearer, a fourth downlink count value of the terminal associated with the second bearer, and a fourth uplink count value of the terminal associated with the second bearer, the fourth downlink count value of the terminal associated with the second bearer being set to a value of TX_NEXT−1 and the fourth uplink count value of the terminal associated with the second bearer being set to a value of RX_NEXT−1.

3. The method of claim 1, wherein in case that a third identity of a third bearer established on the terminal is not included in the first message and the third bearer is configured with the LTE PDCP, fifth information is included in the second message, the fifth information including the third identity of the third bearer, a fifth downlink count value of the terminal associated with the third bearer, and a fifth uplink count value of the terminal associated with the third bearer.

4. The method of claim 1, wherein in case that the first bearer is a uni-directional bearer, sixth information is included in the second message, the sixth information including at least one of a sixth downlink count value of the terminal associated with the first bearer or a sixth uplink count value of the terminal associated with the first bearer set to be 0 for an unused direction.

5. The method of claim 1, wherein in case that the first bearer corresponding to the first identity included in the first message is not established on the terminal, seventh information is included in the second message, the seventh information including the first identity of the first bearer, a seventh downlink count value of the terminal associated with the first bearer with most significant bits set identical to the first downlink count value associated with the first bearer and least significant bits set to 0, and a seventh uplink count value of the terminal associated with the first bearer with most significant bits set identical to the first uplink count value associated with first bearer and least significant bits set to 0.

6. A method performed by a base station in a wireless communication system, the method comprising:
   transmitting, to a terminal, a first message for checking one or more count values associated with one or more bearers, the first message including first information, the first information including a first identity of a first bearer, a first downlink count value associated with the first bearer, and a first uplink count value associated with the first bearer; and
   receiving, from the terminal, a second message as a response to the first message,
   wherein in case that the first bearer is configured with a new radio (NR) packet data convergence protocol (PDCP) and in at least one case in which a most significant bits of a second downlink count value of the terminal associated with the first bearer is different from a most significant bits of the first downlink count value associated with the first bearer or a most significant bits of a second uplink count value of the terminal associated with the first bearer is different from a most significant bits of the first uplink count value associated with the first bearer, second information is included in the second message, the second information including a first identity of the first bearer, the second downlink count value of the terminal associated with the first bearer, and the second uplink count value of the terminal associated with the first bearer, the second downlink count value of the terminal associated with the first bearer being set to a value of TX_NEXT−1 and the second uplink count value of the terminal associated with the first bearer being set to a value of RX_NEXT−1, wherein in case that the first bearer is configured with a long term evolution (LTE) PDCP and in at least one case in which a most significant bits of a third downlink count value of the terminal associated with the first bearer is different from the most significant bits of the first downlink count value associated with the first bearer or a most significant bits of a third uplink count value of the terminal associated with the first bearer is different from the most significant bits of the first uplink count value associated with the first bearer, third information is included in the second message, the third information including the first identity of the first bearer, the third downlink count value of the terminal associated with the first bearer, and the third uplink count value of the terminal associated with the first bearer, and wherein the TX_NEXT is a count value of a next PDCP service data unit (SDU) to be transmitted and the RX_NEXT is a count value of a next PDCP SDU expected to be received.

7. The method of claim 6, wherein in case that a second identity of a second bearer established on the terminal is not included in the first message and the second bearer is configured with the NR PDCP, fourth information is included in the second message, the fourth information including the second identity of the second bearer, a fourth downlink count value of the terminal associated with the second bearer, and a fourth uplink count value of the terminal associated with the second bearer, the fourth downlink count value of the terminal associated with the second bearer being set to a value of TX_NEXT−1 and the fourth uplink count value of the terminal associated with the second bearer being set to a value of RX_NEXT−1.

8. The method of claim 6, wherein in case that a third identity of a third bearer established on the terminal is not included in the first message and the third bearer is configured with the LTE PDCP, fifth information is included in the second message, the fifth information including the third identity of the third bearer, a fifth downlink count value of the terminal associated with the third bearer, and a fifth uplink count value of the terminal associated with the third bearer.

9. The method of claim 6, wherein in case that the first bearer is a uni-directional bearer, sixth information is included in the second message, the sixth information including at least one of a sixth downlink count value of the terminal associated with the first bearer or a sixth uplink count value of the terminal associated with the first bearer set to be 0 for an unused direction.

10. The method of claim 6, wherein in case that the first bearer corresponding to the first identity included in the first message is not established on the terminal, seventh information is included in the second message, the seventh information including the first identity of the first bearer, a seventh downlink count value of the terminal associated with the first bearer with most significant bits set identical to the first downlink count value associated with the first bearer and least significant bits set to 0, and a seventh uplink count value of the terminal associated with the first bearer with most significant bits set identical to the first uplink count value associated with first bearer and least significant bits set to 0.

11. A terminal in a wireless communication system, the terminal comprising:
a transceiver; and
a controller configured to:
receive, from a base station via the transceiver, a first message for checking one or more count values associated with one or more bearers, the first message including first information, the first information including a first identity of a first bearer, a first downlink count value associated with the first bearer and a first uplink count value associated with the first bearer, and
transmit, to the base station via the transceiver, a second message as a response to the first message,
wherein in case that the first bearer is configured with a new radio (NR) packet data convergence protocol (PDCP) and in at least one case in which a most significant bits of a second downlink count value of the terminal associated with the first bearer is different from a most significant bits of the first downlink count value associated with the first bearer or a most significant bits of a second uplink count value of the terminal associated with the first bearer is different from a most significant bits of the first uplink count value associated with the first bearer, second information is included in the second message, the second information including the first identity of the first bearer, the second downlink count value of the terminal associated with the first bearer, and the second uplink count value of the terminal associated with the first bearer, the second downlink count value of the terminal associated with the first bearer being set to a value of TX_NEXT−1 and the second uplink count value of the terminal associated with the first bearer being set to a value of RX_NEXT−1,
wherein in case that the first bearer is configured with a long term evolution (LTE) PDCP and at least one case in which a most significant bits of a third downlink count value of the terminal associated with the first bearer is different from the most significant bits of the first downlink count value associated with the first bearer or a most significant bits of a third uplink count value of the terminal associated with the first bearer is different from the most significant bits of the first uplink count value associated with the first bearer, third information is included in the second message, the third information including the first identity of the first bearer, the third downlink count value of the terminal associated with the first bearer, and the third uplink count value of the terminal associated with the first bearer, and
wherein the TX_NEXT is a count value of a next PDCP service data unit (SDU) to be transmitted and the RX_NEXT is a count value of a next PDCP SDU expected to be received.

12. The terminal of claim 11, wherein in case that a second identity of a second bearer established on the terminal is not included in the first message and the second bearer is configured with the NR PDCP, fourth information is included in the second message, the fourth information including the second identity of the second bearer, a fourth downlink count value of the terminal associated with the second bearer, and a fourth uplink count value of the terminal associated with the second bearer, the fourth downlink count value of the terminal associated with the second bearer being set to a value of TX_NEXT−1 and the fourth uplink count value of the terminal associated with the second bearer being set to a value of RX_NEXT−1.

13. The terminal of claim 11, wherein in case that a third identity of a third bearer established on the terminal is not included in the first message and the third bearer is configured with the LTE PDCP, fifth information is included in the second message, the fifth information including the third identity of the third bearer, a fifth downlink count value of the terminal associated with the third bearer, and a fifth uplink count value of the terminal associated with the third bearer.

14. The terminal of claim 11, wherein in case that the first bearer is a uni-directional bearer, sixth information is included in the second message, the sixth information including at least one of a sixth downlink count value of the terminal associated with the first bearer or a sixth uplink count value of the terminal associated with the first bearer set to be 0 for an unused direction.

15. The terminal of claim 11, wherein in case that the first bearer corresponding to the first identity included in the first message is not established on the terminal, seventh information is included in the second message, the seventh information including the first identity of the first bearer, a seventh downlink count value of the terminal associated with the first bearer with most significant bits set identical to the first downlink count value associated with the first bearer and least significant bits set to 0, and a seventh uplink count value of the terminal associated with the first bearer with most significant bits set identical to the first uplink count value associated with first bearer and least significant bits set to 0.

16. A base station in a wireless communication system, the base station comprising:
  a transceiver; and
  a controller configured to:
    transmit, to a terminal via the transceiver, a first message for checking one or more count values associated with one or more bearers, the first message including first information, the first information including a first identity of a first bearer, a first downlink count value associated with the first bearer, and a first uplink count value associated with the first bearer, and
    receive, from the terminal via the transceiver, a second message as a response to the first message,
  wherein in case that the first bearer is configured with a new radio (NR) packet data convergence protocol (PDCP) and in at least one case in which a most significant bits of a second downlink count value of the terminal associated with the first bearer is different from a most significant bits of the first downlink count value associated with the first bearer or a most significant bits of a second uplink count value of the terminal associated with the first bearer is different from a most significant bits of the first uplink count value associated with the first bearer, second information is included in the second message, the second information including a first identity of the first bearer, the second downlink count value of the terminal associated with the first bearer, and the second uplink count value of the terminal associated with the first bearer, the second downlink count value of the terminal associated with the first bearer being set to a value of TX_NEXT−1 and the second uplink count value of the terminal associated with the first bearer being set to a value of RX_NEXT−1,
  wherein in case that the first bearer is configured with a long term evolution (LTE) PDCP and at least one case in which a most significant bits of a third downlink count value of the terminal associated with the first bearer is different from the most significant bits of the first downlink count value associated with the first bearer or a most significant bits of a third uplink count value of the terminal associated with the first bearer is different from the most significant bits of the first uplink count value associated with the first bearer, third information is included in the second message, the third information including the first identity of the first bearer, the third downlink count value of the terminal associated with the first bearer, and the third uplink count value of the terminal associated with the first bearer, and
  wherein the TX_NEXT is a count value of a next PDCP service data unit (SDU) to be transmitted and the RX_NEXT is a count value of a next PDCP SDU expected to be received.

17. The base station of claim 16, wherein in case that a second identity of a second bearer established on the terminal is not included in the first message and the second bearer is configured with the NR PDCP, fourth information is included in the second message, the fourth information including the second identity of the second bearer, a fourth downlink count value of the terminal associated with the second bearer, and a fourth uplink count value of the terminal associated with the second bearer, the fourth downlink count value of the terminal associated with the second bearer being set to a value of TX_NEXT−1 and the fourth uplink count value of the terminal associated with the second bearer being set to a value of RX_NEXT−1.

18. The base station of claim 16, wherein in case that a third identity of a third bearer established on the terminal is not included in the first message and the third bearer is configured with the LTE PDCP, fifth information is included in the second message, the fifth information including the third identity of the third bearer, a fifth downlink count value of the terminal associated with the third bearer, and a fifth uplink count value of the terminal associated with the third bearer.

19. The base station of claim 16, wherein in case that the first bearer is a uni-directional bearer, sixth information is included in the second message, the sixth information including at least one of a sixth downlink count value of the terminal associated with the first bearer or a sixth uplink count value of the terminal associated with the first bearer set to be 0 for an unused direction.

20. The base station of claim 16, wherein in case that the first bearer corresponding to the first identity included in the first message is not established on the terminal, seventh information is included in the second message, the seventh information including the first identity of the first bearer, a seventh downlink count value of the terminal associated with the first bearer with most significant bits set identical to the first downlink count value associated with the first bearer and least significant bits set to 0, and a seventh uplink count value of the terminal associated with the first bearer with most significant bits set identical to the first uplink count value associated with first bearer and least significant bits set to 0.

* * * * *

UNITED STATES PATENT AND TRADEMARK OFFICE
CERTIFICATE OF CORRECTION

PATENT NO. : 11,032,702 B2  
APPLICATION NO. : 16/946446  
DATED : June 8, 2021  
INVENTOR(S) : Donggun Kim et al.

Page 1 of 1

It is certified that error appears in the above-identified patent and that said Letters Patent is hereby corrected as shown below:

In the Claims

Column 47, Claim 1, Line 48,  
Column 48, Claim 2, Line 15,  
Column 49, Claim 6, Line 8 and Claim 7, Line 41,  
Column 50, Claim 11, Line 38,  
Column 51, Claim 12, Line 5,  
Column 52, Claim 16, Line 1 and Claim 17, Line 35:  
Each occurrence of "TX_NEXT-1" should be changed to --RX_NEXT-1--;

Column 47, Claim 1, Lines 50-51,  
Column 48, Claim 2, Line 17,  
Column 49, Claim 6, Line 10 and Claim 7, Line 43,  
Column 50, Claim 11, Lines 40-41,  
Column 51, Claim 12, Line 7,  
Column 52, Claim 16, Line 3-4 and Claim 17, Line 37:  
Each occurrence of "RX_NEXT-1" should be changed to --TX_NEXT-1--.

Signed and Sealed this  
Twenty-first Day of May, 2024

Katherine Kelly Vidal  
*Director of the United States Patent and Trademark Office*